US010306298B2

United States Patent
Kim

(10) Patent No.: US 10,306,298 B2
(45) Date of Patent: May 28, 2019

(54) IMAGE PROCESSING APPARATUS AND CONTROL METHOD THEREOF

(71) Applicant: SAMSUNG ELECTRONICS CO., LTD., Suwon-si, Gyeonggi-do (KR)

(72) Inventor: Je-ik Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/422,906

(22) Filed: Feb. 2, 2017

(65) Prior Publication Data

US 2017/0230707 A1 Aug. 10, 2017

(30) Foreign Application Priority Data

Feb. 5, 2016 (KR) .................. 10-2016-0015268

(51) Int. Cl.

| | |
|---|---|
| *H04N 7/173* | (2011.01) |
| *H04N 21/434* | (2011.01) |
| *H04N 21/234* | (2011.01) |
| *H04N 21/236* | (2011.01) |
| *H04N 21/2362* | (2011.01) |
| *H04N 21/438* | (2011.01) |

(Continued)

(52) U.S. Cl.

CPC ....... *H04N 21/4345* (2013.01); *H04N 21/234* (2013.01); *H04N 21/2362* (2013.01); *H04N 21/23605* (2013.01); *H04N 21/4343* (2013.01); *H04N 21/4383* (2013.01); *H04N 21/4384* (2013.01); *H04N 21/44* (2013.01); *H04N 21/4622* (2013.01); *H04N 21/6118* (2013.01); *H04N 21/6125* (2013.01); *H04N 21/6143* (2013.01); *H04N 21/8586* (2013.01)

(58) Field of Classification Search

CPC ........... H04N 21/4345; H04N 21/6143; H04N 21/4343; H04N 21/23605; H04N 21/4383; H04N 21/2362; H04N 21/44; H04N 21/234; H04N 21/8586

USPC ......................................................... 725/116

See application file for complete search history.

(56) References Cited

U.S. PATENT DOCUMENTS

| | | | |
|---|---|---|---|
| 7,092,888 B1 * | 8/2006 | McCarthy ............. | G10L 15/063 379/88.01 |
| 7,774,815 B1 * | 8/2010 | Allen ................. | H04N 5/44513 725/51 |

(Continued)

FOREIGN PATENT DOCUMENTS

| | | |
|---|---|---|
| KR | 10-2007-0016037 | 2/2007 |
| KR | 10-2007-0027780 | 3/2007 |

(Continued)

*Primary Examiner* — Michael B. Pierorazio

(74) *Attorney, Agent, or Firm* — Nixon & Vanderhye P.C.

(57) ABSTRACT

An image processing apparatus includes: a signal receiver configured to receive a content signal comprising video data and first extraction information used in extracting the video data; a signal processor configured to process the video data extracted from the content signal; a communicator comprising communication circuitry configured to communicate with a server; and a controller configured to receive second extraction information from the server through the communication circuitry of the communicator, to extract the video data from the content signal based on the received second extraction information, and to control the signal processor to process an image based on the extracted video data.

20 Claims, 17 Drawing Sheets

(51) Int. Cl.
  *H04N 21/44* (2011.01)
  *H04N 21/61* (2011.01)
  *H04N 21/858* (2011.01)
  *H04N 21/462* (2011.01)

(56) References Cited

U.S. PATENT DOCUMENTS

| | | | | |
|---|---|---|---|---|
| 7,814,524 | B2* | 10/2010 | Candelore | H04N 5/44543 |
| | | | | 715/716 |
| 8,296,808 | B2* | 10/2012 | Hardacker | H04N 7/163 |
| | | | | 725/131 |
| 8,396,217 | B2 | 3/2013 | Won | |
| 8,423,363 | B2* | 4/2013 | Gupta | G10L 15/22 |
| | | | | 704/231 |
| 8,572,488 | B2* | 10/2013 | Phillips | G06F 3/0482 |
| | | | | 715/230 |
| 8,582,644 | B2 | 11/2013 | Lu et al. | |
| 8,694,533 | B2* | 4/2014 | Oztaskent | G06F 17/30026 |
| | | | | 707/769 |
| 8,712,218 | B1* | 4/2014 | Begeja | G11B 27/11 |
| | | | | 386/248 |
| 2002/0170068 | A1* | 11/2002 | Rafey | G06F 17/30823 |
| | | | | 725/112 |
| 2003/0025832 | A1* | 2/2003 | Swart | H04N 7/17318 |
| | | | | 348/461 |
| 2003/0206717 | A1* | 11/2003 | Yogeshwar | H04N 5/76 |
| | | | | 386/328 |
| 2004/0096110 | A1* | 5/2004 | Yogeshwar | G06F 17/3028 |
| | | | | 382/239 |
| 2004/0210931 | A1* | 10/2004 | Gordon | H04N 21/2383 |
| | | | | 725/39 |
| 2005/0080915 | A1* | 4/2005 | Shoemaker | H04L 29/06027 |
| | | | | 709/231 |
| 2005/0188411 | A1* | 8/2005 | Dacosta | G06F 17/30038 |
| | | | | 725/110 |
| 2005/0204646 | A1* | 9/2005 | Tupper | E05B 65/462 |
| | | | | 52/36.5 |
| 2006/0015339 | A1* | 1/2006 | Charlesworth | G06F 17/30038 |
| | | | | 704/251 |
| 2007/0061862 | A1* | 3/2007 | Berger | H04N 7/163 |
| | | | | 725/139 |
| 2007/0110057 | A1* | 5/2007 | Hwang | H04N 7/17318 |
| | | | | 370/389 |
| 2007/0112837 | A1* | 5/2007 | Houh | G06F 17/30247 |
| 2007/0124756 | A1* | 5/2007 | Covell | G06F 17/30743 |
| | | | | 725/18 |
| 2007/0124788 | A1* | 5/2007 | Wittkoter | H04N 7/165 |
| | | | | 725/112 |
| 2008/0091713 | A1* | 4/2008 | Candelore | H04N 7/163 |
| 2008/0097984 | A1* | 4/2008 | Candelore | G06F 17/30253 |
| 2008/0148318 | A1* | 6/2008 | Jung | H04H 60/72 |
| | | | | 725/54 |
| 2008/0204595 | A1* | 8/2008 | Rathod | G06F 17/30796 |
| | | | | 348/465 |
| 2009/0070811 | A1* | 3/2009 | Song | H04H 60/73 |
| | | | | 725/39 |
| 2009/0210899 | A1* | 8/2009 | Lawrence-Apfelbaum | H04L 12/2801 |
| | | | | 725/34 |
| 2009/0253416 | A1* | 10/2009 | Lee | H04H 60/72 |
| | | | | 455/414.1 |
| 2010/0162334 | A1* | 6/2010 | Suh | H04N 5/4401 |
| | | | | 725/109 |
| 2010/0180310 | A1* | 7/2010 | Lee | H04H 60/72 |
| | | | | 725/54 |
| 2010/0250764 | A1* | 9/2010 | Vare | H04N 21/234327 |
| | | | | 709/231 |
| 2010/0299702 | A1* | 11/2010 | Lo | G06Q 20/123 |
| | | | | 725/39 |
| 2010/0316131 | A1* | 12/2010 | Shanableh | G06T 7/0002 |
| | | | | 375/240.24 |
| 2011/0055867 | A1* | 3/2011 | Lee | G06Q 30/0603 |
| | | | | 725/40 |
| 2011/0069940 | A1* | 3/2011 | Shimy | G11B 27/105 |
| | | | | 386/296 |
| 2011/0126239 | A1* | 5/2011 | Lee | H04L 65/1016 |
| | | | | 725/50 |
| 2011/0145883 | A1* | 6/2011 | Godar | H04N 5/445 |
| | | | | 725/131 |
| 2011/0258654 | A1* | 10/2011 | Lee | H04N 21/2362 |
| | | | | 725/1 |
| 2011/0289530 | A1* | 11/2011 | Dureau | H04N 21/4622 |
| | | | | 725/38 |
| 2011/0289533 | A1* | 11/2011 | White | G06F 17/3002 |
| | | | | 725/46 |
| 2011/0307925 | A1* | 12/2011 | Vaysman | H04N 5/44543 |
| | | | | 725/48 |
| 2013/0051464 | A1 | 2/2013 | Bae | |
| 2013/0097627 | A1* | 4/2013 | Hwang | H04H 60/73 |
| | | | | 725/25 |
| 2014/0002593 | A1* | 1/2014 | Zhang | H04N 21/435 |
| | | | | 348/42 |
| 2014/0020036 | A1* | 1/2014 | Hasek | H04N 7/17309 |
| | | | | 725/95 |
| 2014/0047496 | A1* | 2/2014 | Kim | H04N 7/0882 |
| | | | | 725/137 |
| 2015/0026746 | A1* | 1/2015 | Fondberg | H04L 65/4084 |
| | | | | 725/112 |
| 2015/0082349 | A1* | 3/2015 | Ishtiaq | H04N 21/23418 |
| | | | | 725/40 |

FOREIGN PATENT DOCUMENTS

KR 10-2011-0042201 4/2011
KR 10-2013-0024571 3/2013

* cited by examiner

IMAGE PROCESSING APPARATUS AND CONTROL METHOD THEREOF

CROSS-REFERENCE TO RELATED APPLICATION

This application is based on and claims priority under 35 U.S.C. § 119 to Korean Patent Application No. 10-2016-0015268 filed on Feb. 5, 2016 in the Korean Intellectual Property Office, the disclosure of which is incorporated by reference herein in its entirety.

BACKGROUND

Field

The present disclosure relates generally to an image processing apparatus, which receives a broadcast signal or the like content signal from the exterior and processes it to be displayed as an image, and a control method thereof, and for example to an image processing apparatus, which has a structure for minimizing and/or reducing a time delay taken until a switched channel image is displayed in response to a user's channel switching instruction while processing a content signal including a plurality of content channels, and a control method thereof.

Description of Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus receives a content signal including video data from the exterior and processes the video data extracted from the content signal in accordance with various image processing processes. The image processing apparatus may display an image based on the processed video data on its own display panel, or output the processed video data to another display apparatus provided with a panel so that on the corresponding display apparatus can display an image based on the processed image signal. As a representative of the image processing apparatus that has no display panel, there is a set-top box. The image processing apparatus that has a display panel is called a display apparatus, and may for example includes a TV, a monitor, a portable multimedia player (PMP), a tablet computer, a mobile phone, etc.

The image processing apparatus may receive a content signal from various image sources by various methods. For example, the content signal received in the image processing apparatus may be a radio frequency (RF) signal transmitted from a transmitter of a broadcasting station, or packet data transmitted from a server via the Internet. The image processing apparatus is tuned to a frequency of a channel designated by a user with regard to the content signal received as above, and extracts and processes video data from the tuned content signal, thereby displaying a content image of the channel designated by the user. During such tuning and processing procedures, system resources in the display apparatus are selectively assigned and distributed with respect to a central processing unit (CPU).

In addition, there is a predetermined time interval between time of giving an instruction on a channel switch and time of displaying a switched-channel image, and therefore the image processing apparatus displays the switched-channel image after a delay of a predetermined time from the moment when a user gives the instruction to switch over to a specific channel. Such a time delay is varied depending on many factors such as the structure of the image processing apparatus, characteristics of a content signal, communication environments for transmitting a signal, etc. For example, it takes about 1.0 to 1.8 seconds to switch a digital television (DTV) channel based on a compression format of a moving picture experts group (MPEG). Like this, the image processing apparatus cannot display a switched-channel image during the delayed time, and it is thus important to shorten the time taken in displaying the switched-channel image in light of giving a user less inconvenience.

SUMMARY

According to an aspect of an example embodiment, an image processing apparatus is provided, including: a signal receiver configured to receive a content signal comprising video data and first extraction information used in extracting the video data; a signal processor configured to process the video data extracted from the content signal; a communicator comprising communication circuitry configured to communicate with a server; and a controller configured to receive preset second extraction information from the server through the communication circuitry of the communicator, to extract the video data from the content signal based on the received second extraction information, and to control the signal processor to process an image based on the extracted video data. Thus, the image processing apparatus receives the second extraction information from a separate server to extract video data from the content signal instead of extracting the first extraction information from the content signal, thereby shortening the time taken in selecting or switching a channel.

The signal processor may be configured to extract the preset first extraction information corresponding to a certain channel from the content signal received in the signal receiver, and the controller may receive the second extraction information from the server through the communicator and may provide the second extraction information to the signal processor to make the signal processor skip extracting the first extraction information in response to a channel selecting instruction of the content signal. Thus, the image processing apparatus can reduce a time delay due to channel selection even though the information needed for extracting the video data from the content signal is acquired in response to the channel selecting instruction.

The signal receiver may receive the content signal through a broadcast network, and the communicator may communicate with the server through a broadband network. Thus, the image processing apparatus can receive the content signal through the broadcast network for receiving the video data of relatively high quality, and receive the information about the content signal through the broadband network, thereby shortening the time taken in switching the channel.

The signal processor may include a demultiplexer configured to extract packet identifier (PID) information from the content signal received in the signal receiver and extract video data from the content signal based on the extracted PID information, and the controller may acquire the PID information from the second extraction information received through the communicator and may provide the PID information to the demultiplexer to make the demultiplexer skip extracting the PID information. Thus, the image processing apparatus can reduce time taken in extracting the PID from the content signal by the demultiplexer.

The controller may receive from the server the second extraction information of a channel corresponding to the channel selecting instruction among a plurality of channels of the content signal. Thus, the image processing apparatus can more quickly acquire information from the server.

The image processing apparatus may further include a storage, and the controller may receive from the server the second extraction information of all channels involved in the content signal in response to the channel selecting instruction and stores the second extraction information in the storage, and may call the second extraction information from the storage instead of receiving the second extraction information from the server in response to the channel selecting instruction given after storing the second extraction information in the storage. Thus, the image processing apparatus does not have to receive the second extraction information from the server again after the second extraction information is received once from the server, and uses the previously stored second extraction information to thereby shorten the taken time.

The image processing apparatus may further include a storage configured to store a channel map, and the controller may acquire uniform resource locator (URL) information of the second extraction information of a channel selected in the content signal from the channel map in response to the channel selecting instruction, and may acquire the second extraction information stored in the server based on the URL information. Thus, it is easy for the image processing apparatus to take the necessary information from the server.

The first extraction information and the second extraction information may include metadata of the content signal.

The controller may process a first content signal to display a second channel image in response to an instruction for switching over from a first channel in the first content signal received in the signal receiver to a second channel, may process a second content signal received through the communicator and having the same content as the first content signal to display a second channel image of the second content signal, and the controller may stop displaying the second channel image of the second content signal and may start displaying the second channel image of the first content signal in response to processing completion of the first content signal. Thus, the image processing apparatus can minimize a no-image period where any image is not displayed while the first channel is switched over to the second channel.

The controller may synchronize the second channel image of the second content signal with the second channel image of the first content signal by determining a video frame having a time stamp, which is equal to a video frame in the second content signal, among video frames in the first content signal. Thus, the image processing apparatus switches over from the second channel image of the second content signal to the second channel image of the first content signal without discontinuity of the scenes.

According to an aspect of another example embodiment, a method of controlling an image processing apparatus is provided, the method including: receiving a content signal which includes video data and first extraction information used in extracting the video data from a content source; receiving preset second extraction information from a server; extracting, by a signal processor, the video data from the content signal based on the second extraction information; and processing, by the signal processor, an image based on the video data. Thus, the image processing apparatus receives the second extraction information from a separate server to extract video data from the content signal instead of extracting the first extraction information from the content signal, thereby shortening the time taken in selecting and/or switching a channel.

The signal processor may be configured to extract the preset first extraction information corresponding to a certain channel from the content signal, the receiving the second extraction information may include receiving the second extraction information from the server and providing the second extraction information to the signal processor to make the signal processor skip extracting the first extraction information in response to a channel selecting instruction of the content signal. Thus, the image processing apparatus can reduce a time delay due to channel selection even though the information needed for extracting the video data from the content signal is acquired in response to the channel selecting instruction.

The image processing apparatus may receive the content signal through a broadcast network, and may communicate with the server through a broadband network. Thus, the image processing apparatus can receive the content signal through the broadcast network for receiving the video data of relatively high quality, and receive the information about the content signal through the broadband network, thereby shortening the time taken in switching the channel.

The signal processor may include a demultiplexer configured to extract packet identifier (PID) information from the content signal and extract video data from the content signal based on the extracted PID information, and the providing the second extraction information received from the server to the signal processor may include acquiring the PID information from the second extraction information and providing the PID information to the demultiplexer to make the demultiplexer skip extracting the PID information. Thus, the image processing apparatus can reduce time taken in extracting the PID from the content signal by the demultiplexer.

The receiving the second extraction information may include receiving from the server the second extraction information of a channel corresponding to the channel selecting instruction among a plurality of channels of the content signal. Thus, the image processing apparatus can more quickly acquire information from the server.

The receiving the second extraction information may include receiving and storing from the server the second extraction information of all channels involved in the content signal in response to the channel selecting instruction; and calling the previously stored second extraction information instead of receiving the second extraction information from the server in response to the channel selecting instruction given after storing the second extraction information of all the channels. Thus, the image processing apparatus does not have to receive the second extraction information from the server again after the second extraction information is received once from the server, and uses the previously stored second extraction information to thereby shorten the taken time.

The receiving the second extraction information may include acquiring URL information of the second extraction information of a channel selected in the content signal from a channel map in response to the channel selecting instruction; and acquiring the second extraction information stored in the server based on the URL information. Thus, it is easy for the image processing apparatus to take the necessary information from the server.

The first extraction information and the second extraction information may include metadata of the content signal.

The method may further include: processing a first content signal to display a second channel image in response to an instruction for switching over from a first channel in the first content signal received from the content source to a second channel, and processing a second content signal received from the server and having the same content as the first content signal to display a second channel image of the second content signal; and stopping displaying the second channel image of the second content signal and starting displaying the second channel image of the first content signal in response to processing completion of the first content signal. Thus, the image processing apparatus can minimize and/or reduce a no-image period where any image is not displayed while the first channel is switched over to the second channel.

The stopping displaying the second channel image of the second content signal and the starting displaying the second channel image of the first content signal may include synchronizing the second channel image of the second content signal with the second channel image of the first content signal by determining a video frame having a time stamp, which is equal to a video frame in the second content signal, among video frames in the first content signal. Thus, the image processing apparatus switches over from the second channel image of the second content signal to the second channel image of the first content signal without discontinuity of the scenes.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Below, various example embodiments will be described in greater detail with reference to accompanying drawings. The following descriptions of the example embodiments are made by referring to elements illustrated in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Further, the example embodiments will describe elements directly related to the idea of the disclosure, and description of the other elements may be omitted. However, it will be appreciated that the elements, the descriptions of which are omitted, are not unnecessary to realize the apparatus or system according to the example embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Further, the embodiments respectively described with reference to the accompanying drawings are not exclusive to each other unless otherwise mentioned, and a plurality of embodiments may be selectively combined within one apparatus. The combination of these plural embodiments may be discretionally selected and applied to realize the present disclosure by a person having an ordinary skill in the art.

Figure 1:
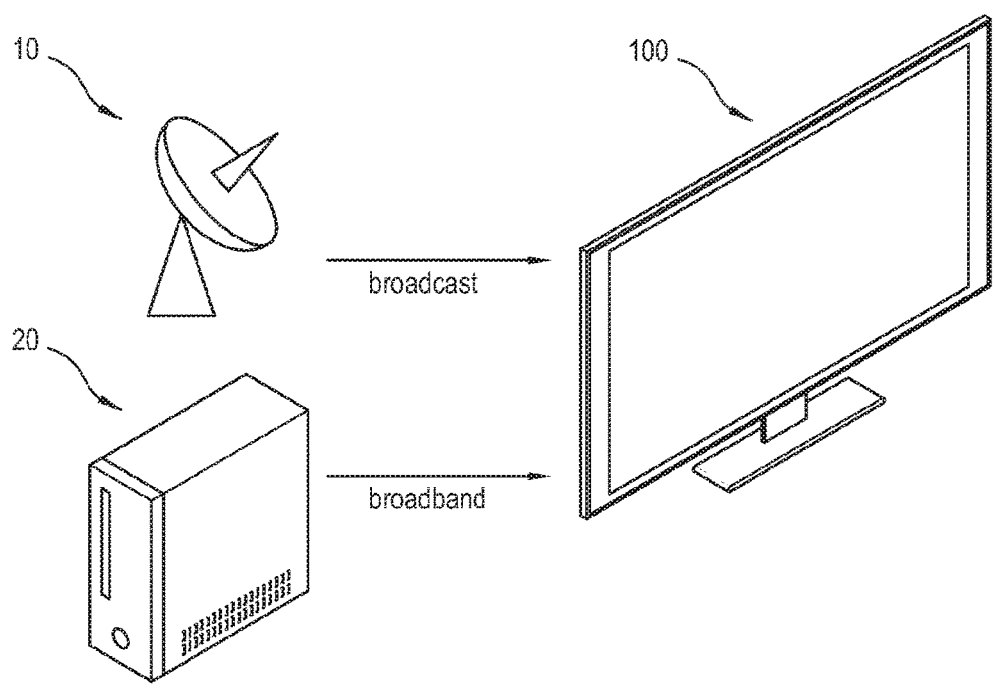
FIG. 1 is a diagram illustrating an example of a system according to a first example embodiment.

FIG. 1 is a diagram illustrating an example of a system according to a first example embodiment of the present disclosure.

As illustrated in FIG. 1, the system according to the first example embodiment includes an image processing apparatus 100, and various content sources 10 and 20 for providing content signals to the image processing apparatus 100. In this example embodiment, the content signal includes broadcast programs corresponding to a plurality of channels, and the image processing apparatus 100 includes a television (TV) tuned to a specific channel in a content signal and displaying a broadcast program image based on the content signal. However, the present disclosure is not limited to this embodiment, and for example the image processing apparatus 100 may include a set-top box for outputting a content signal to a separate TV, or a mobile display device other than the TV.

As a network for receiving a content signal, the image processing apparatus 100 may use a broadcast network and a broadband network. Here, the image processing apparatus 100 is achieved by a hybrid terminal to which the broadcast network and the broadband network are connected in parallel. In the broadband network, a bidirectional IP connection is used as a frequency band for streaming or downloading audio/video (AV) content. The broadcast network includes digital video broadcasting-terrestrial (DVB-T), DVB-satellite (S), DVB-cable (C), and the like for unidirectional transmission.

The image processing apparatus 100 may receive linear A/V content, asynchronous A/V content, application data, application signaling information and the like through the broadcast network. Although the image processing apparatus 100 is not connected to the broadband network, such connection to the broadcast network allows the image processing apparatus 100 to receive a broadcast-related application. In addition, it is possible to do signaling for a stream event about an application through the broadcast network.

Here, a broadcast-related application refers to a broadcast TV, radio or data channel, or an interactive application relative to content of this channel. On the other hand, a broadcast-independent application refers to any broadcast channel or an interactive application irrelative to other broadcast data.

Further, the image processing apparatus 100 may receive application data, nonlinear A/V content and the like through the broadband network. Here, the nonlinear A/V content refers to content of which a view time or a playing point is freely selected by a user like Streaming on Demand, and the linear A/V content refers to push-type content which is viewable only at a specific time when a provider provides the content. Through the broadband network, the image processing apparatus 100 may communicate with an external device (not shown) connected to the same network.

Like this, the image processing apparatus 100 may receive content signals from the content sources 10 and 20 through the broadcast network or the broadband network.

Below, various example hardware components of the image processing apparatus 100 will be described with reference to FIG. 2.

Figure 2:
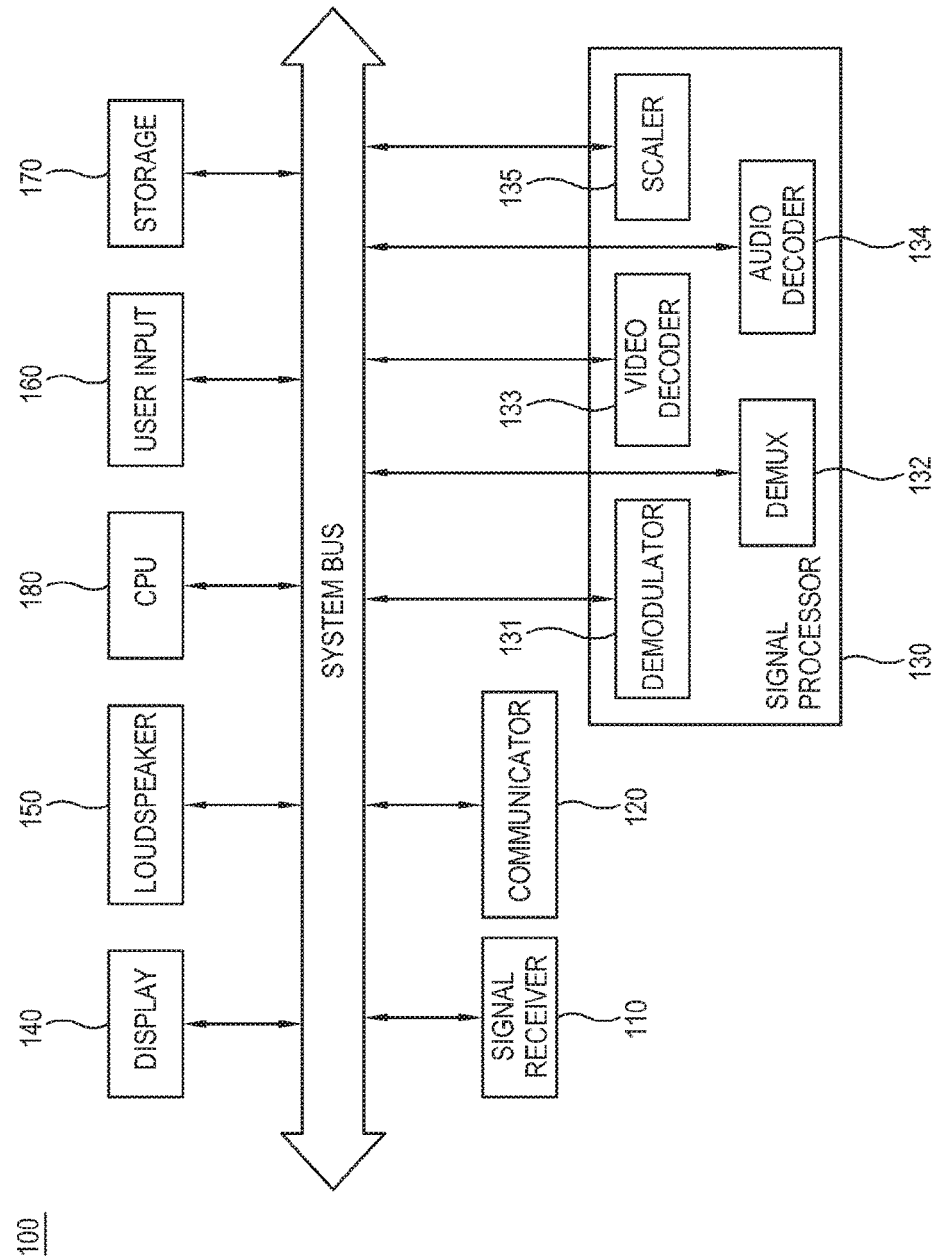
FIG. 2 is a block diagram illustrating an example image processing apparatus according to a first example embodiment.

FIG. 2 is a block diagram illustrating an example image processing apparatus 100 according to the first example embodiment.

As illustrated in FIG. 2, the image processing apparatus 100 includes a signal receiver 110 for receiving a content signal through the broadcast network, a communicator (e.g., including communication circuitry) 120 for receiving a content signal through the broadband network, a signal processor 130 for processing the content signal received through the signal receiver 110 or the communicator 120, a display 140 for displaying an image based on video data of the content signal processed by the signal processor 130, a loudspeaker 150 for outputting a sound based on audio data of the content signal processed by the signal processor 130, a user input (e.g., including input circuitry) 160 for receiving a user's input, a storage 170 for storing data, and a CPU 180 for performing computation for a process of the signal processor 130 and controlling operations of the image processing apparatus 100. These elements are connected one another through a system bus.

In this example embodiment, the CPU 180 is provided separately from the signal processor 130, but not limited thereto. Alternatively, the CPU 180 and the signal processor 130 may be integrated into a single system on chip (SOC).

The signal receiver 110 receives a content signal through the broadcast network. If the image processing apparatus 100 is a TV, the signal receiver 110 is tuned to a frequency of a content signal designated by the CPU 180. To this end, the signal receiver 110 includes a tuning chip to be tuned to a radio frequency (RF) signal.

The signal receiver 110 including the tuning chip receives a content signal and is tuned to a specific frequency of a designated channel, thereby converting the content signal into a transport stream (TS). The signal receiver 110 converts a high-frequency carrier wave into an intermediate-frequency band signal and converts the intermediate-frequency band signal into a digital signal, thereby generating the transport stream. To this end, the signal receiver 110 may include an analog/digital (A/D) converter. Alternatively, the A/D converter may be involved in not the signal receiver 110 but a demodulator 131.

The communicator 120 may include various communication circuitry that receives a content signal through the broadband network, for example, packet data from a server (not shown) through the Internet. The communicator 120 supports at least one of a wired protocol and a wireless protocol. To this end, the communicator 120 includes an Ethernet module for the wired protocol, or a wireless communication module for the wireless protocol. The communicator 120 may include both the Ethernet module and the wireless communication module to cope with the wired protocol and the wireless protocol. For example, the wireless communication module may support a wireless fidelity (Wi-Fi) protocol.

The signal processor 130 performs various processes with respect to a content signal received in the signal receiver 110 or the communicator 120. The signal processor 130 extracts video data from a content signal, applies a video processing process to the extracted video data, and outputs the processed video data to the display 140 so that the display 140 can display an image.

The signal processor 130 is provided to perform various processes in accordance with the kinds and characteristics of the signal or data, and thus the process performed in the signal processor 130 is not limited to the video processing process. Further, data to be processed by the signal processor 130 is not limited to that received in the signal receiver 110 or the communicator 120. For example, the signal processor 130 applies an audio processing process to audio data extracted from the content signal, and outputs the processed audio data to the loudspeaker 150. Further, if a user's voice is input to the image processing apparatus 100, the signal processor 130 processes the voice by a preset voice recognition process. The signal processor 130 may be achieved by a system on chip (SoC) where many functions as described above are integrated, or a processing board (not shown) formed by attaching individual chipsets for independently performing the respective processes to a printed circuit board.

The signal processor 130 may include various circuitry, such as, for example, and without limitation, a demodulator 131, a deMUX 132, a video decoder 133, an audio decoder 134 and a scaler 135. This example embodiment describes only the elements of the signal processor 130 directly related to the present disclosure, and thus the signal processor 130 may actually include additional elements not mentioned in this example embodiment.

The demodulator 131 plays an opposite role to a modulator for modulating a signal, e.g., converts a content signal transferred from the signal receiver 110 into a transport stream. Since the content signal received in the signal receiver 110 is a signal modulated at a transmitter, the demodulator 131 demodulates the modulated content signal into an original content signal to be processed in the signal processor 130. After the demodulation of the demodulator 131, a signal transferred from the demodulator 131 to the deMUX 132 is given in the form of a transport stream.

The demultiplexer (deMUX) 132 plays an opposite role to a multiplexer, e.g., connects one input terminal to a plurality of output terminals, thereby distributing a stream input to the input terminal to the respective output terminals in accordance with a selection signal. For example, if there are four output terminal with respect to one input terminals, the deMUX 132 may select each output terminal by combining two selection signals of 0 or 1.

If the deMUX 132 is applied to the image processing apparatus 100, the transport stream transferred from the demodulator 131 is divided into a plurality of sub data. The deMUX 132 operates with the following steps. The deMUX 132 first extracts metadata from the transport stream, second extracts sub data such as video data, audio data, etc. from the transport stream based on the metadata, and third outputs the sub data through the corresponding output terminals.

The metadata include various pieces of information, e.g., a packet identifier (PID) to be referred in order to process a content signal. The metadata may include program specific information (PSI), a program and system information protocol (PSIP), etc., and details of the metadata will be described later.

The PID refers to an identifier assigned to each packet of the transport stream. The sub data according to channels in the transport stream is independently compressed and packetized, and a packet corresponding to one channel is assigned with the same PID and thus distinguished from a packet corresponding to another channel. The deMUX 132 extracts the PID from the metadata, classifies the packets of the transport stream according to the extracted PID, and extracts the sub data having the same PID.

The video decoder 133 reversely performs an encoding operation with regard to video data if the video data encoded by a specific format is output from the deMUX 132, thereby restoring the video data to its original data of before encoding. If the video data output from the deMUX 132 is not encoded by a specific format, e.g., is uncompressed data, the video decoder 133 transfers the video data to the scaler 135 without decoding.

The video decoder 133 receives video data from the deMUX 132 if a content signal is transmitted through the broadcast network, and receives video data from the communicator 120 if a content signal is transmitted through the broadband network. Likewise, the same is applied to the audio decoder 134.

The video decoder 133 performs decoding based on the metadata extracted by the deMUX 132, and may for example decode the video data based on resolution information of the metadata.

The audio decoder 134 decodes and outputs audio data to the loudspeaker 150 if the audio data encoded by a specific format is received from the deMUX 132.

The scaler 135 scales the decoded and uncompressed video data received from the video decoder 133, according to the resolution of the display 140 or a separately selected resolution, and then outputs the scaled video data to the display 140.

The display 140 displays an image based on the video data processed by the signal processor 130. There are no limits to the type of the display 140, and the display 140 may include a display panel achieved by a liquid crystal display (LCD) or the like light-receiving structure or an organic light emitting diode (OLED) or the like self-emissive structure. Further, the display 140 may include additional elements as well as the display panel. For example, in the case of the LCD structure, the display 140 includes an LCD panel (not shown), a backlight unit (not shown) for emitting light to the LCD panel (not shown), a panel driving substrate (not shown) for driving the LCD panel (not shown), etc.

The loudspeaker 150 outputs a sound based on an audio signal processed by the signal processor 130. The loudspeaker 150 vibrates air in accordance with the audio signal and changes air pressure, thereby outputting a sound. The loudspeaker 150 includes a unit loudspeaker corresponding to an audio signal of a specific frequency band, and may include a plurality of unit loudspeakers respectively corresponding to audio signals of plural frequency bands. The loudspeaker 150 includes a woofer, a mid-range, a tweeter, etc. according to frequency bands of output sounds. One or more among the woofer, the mid-range, the twitter, etc. are selectively applied to the image processing apparatus 100.

The user input 160 may include various input circuitry that transfers various preset control commands or information corresponding to a user's control or input to the CPU 180 or the signal processor 130. That is, the user input 160 transfers various events generated by a user's control corresponding to the user's intention to the CPU 180 or the signal processor 130.

The user input 160 may be variously achieved in accordance with input types of information. For example, the user input 160 may include various input circuitry, such as, for example, and without limitation, a button provided on the outer side of the image processing apparatus 100, a touch screen provided in the display 140, a microphone (not shown) for receiving a user's voice input, a camera (not shown) for photographing or sensing an external environment of the image processing apparatus 100, and the like user interface environment provided in the image processing apparatus 100. A remote controller (not shown) is also regarded as a kind of user interface environments. However, the remote controller (not shown) is separated from a main body of the image processing apparatus 100, and thus transmits a control signal to a control signal receiver (not shown) provided in the main body of the image processing apparatus 100.

The storage 170 stores various pieces of data under process and control of the signal processor 130 and the CPU 180. The storage 170 is accessed by the CPU 180 to perform reading, writing, editing, deleting, updating, etc. to data. The storage 170 is achieved by a flash memory, a hard-disc drive (HDD), a solid-state drive (SSD) or the like nonvolatile memory to retain data regardless of whether the image processing apparatus 100 is powered on or off.

As an example of data to be stored in the storage 170, there is a channel map. If a user inputs a channel number through the user input 160, the CPU 180 searches a frequency value corresponding to the channel number in the channel map stored in the storage 170, and transfers the searched frequency value to the signal receiver 110. Thus, the signal receiver 110 selectively receives a content signal based on the frequency value received from the CPU 180.

The CPU 180 performs main computation for operations of general elements in the signal processor 130, and basically plays a main role in analysis and computation of data. The CPU 180 internally includes a processor register (not shown) where commands to be processed is stored; an arithmetic logic unit (ALU) (not shown) for comparison, determination and computation; a control unit (not shown) for internally controlling the CPU 180 for analysis and correct execution of the commands; a bus (not shown); a cache (not shown); etc.

The CPU 180 performs computation needed for the operation of each element in the signal processor 130. However, the signal processor 130 may be designed to operate without data computation of the CPU 180 or operate with a separate microcontroller (not shown).

The CPU 180 may assign or distribute the whole resources of the image processing apparatus 100 to the elements in accordance with the required operations. For example, the CPU 180 may activate the signal receiver 110, the demodulator 131, the deMUX 132, the video decoder 133, the audio decoder 134, the scaler 135, and the like in case of processing a content signal of the broadcast network. On the other hand, the CPU 180 may activate the communicator 120, the video decoder 133, the audio decoder 134, the scaler 135 and the like in case of processing a content signal of the broadband network. The CPU 180 may inactivate the elements, which are not involved in the current operations, in accordance with specific conditions.

Figure 3:
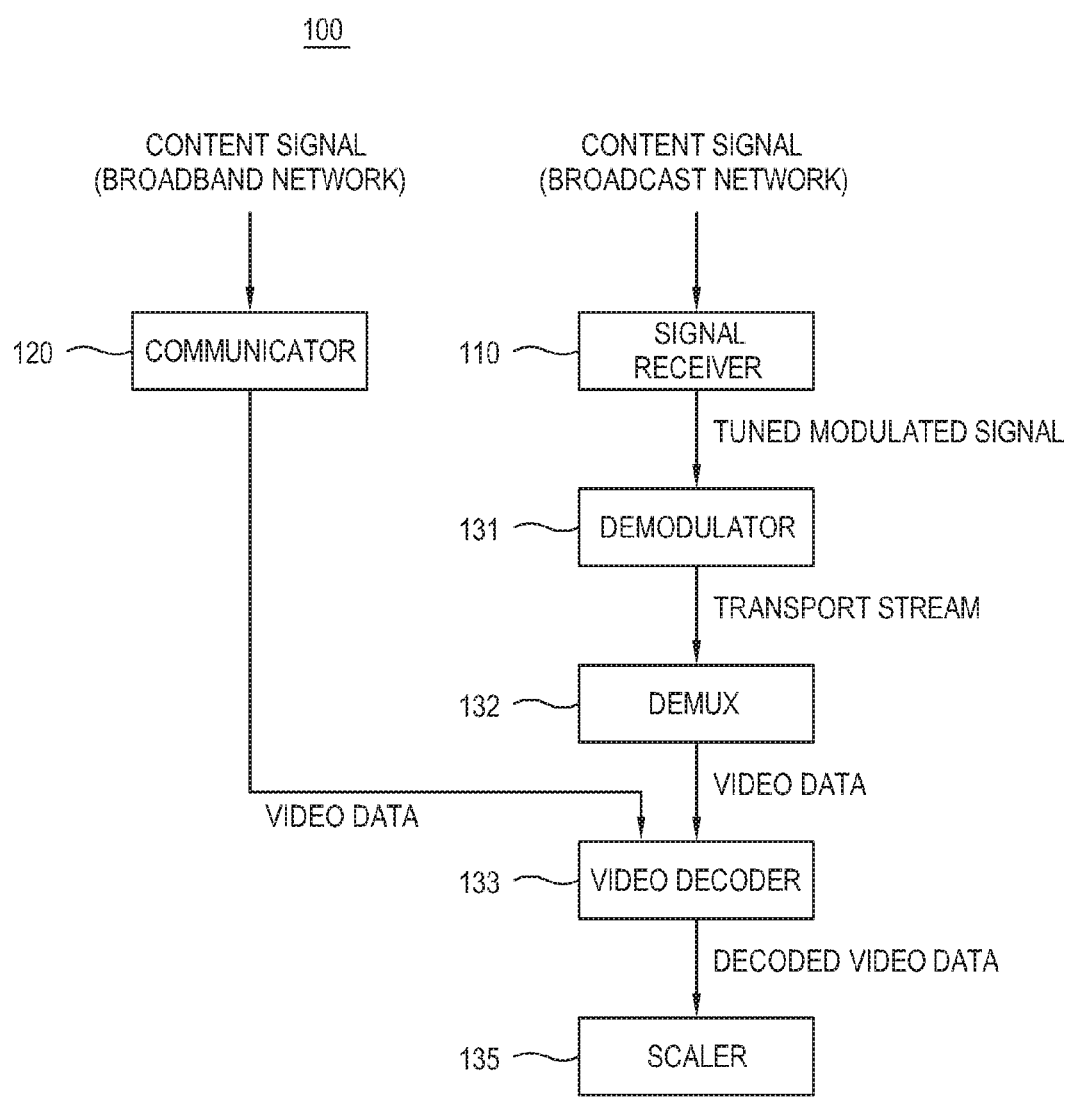
FIG. 3 is a block diagram illustrating an example procedure of processing a content signal in elements according to systems of receiving the content signal in the image processing apparatus according to a first example embodiment.

FIG. 3 is a block diagram illustrating an example procedure of processing a content signal in elements according to systems of receiving the content signal in the image processing apparatus 100 according to the first example embodiment.

As illustrated in FIG. 3, the image processing apparatus 100 receives a content signal from a content source through the broadcast network or the broadband network. The content signal may include various kinds of data in addition to video data. In this example embodiment, only the video data will be described representatively.

In the case of receiving a content signal through the broadcast network, the signal receiver 110 receives a carrier signal from the content source. The carrier signal includes a content signal modulated in the content source. The signal receiver 110 is tuned to a tuning frequency of a content signal and transmits the tuned content signal to the demodulator 131.

The demodulator 131 demodulates the received content signal into a transport stream, and transfers the transport stream to the deMUX 132.

The deMUX 132 extracts video data compressed by a specific format from the transport stream, and transfers the compressed video data to the video decoder 133.

The video decoder 133 decodes the compressed video data, and transfers the decoded video data to the scaler 135.

On the other hand, in the case of receiving a content signal through the broadband network, the communication circuitry of the communicator 120 receives a content signal from the content source. In the case of the broadband network, the content signal is transmitted in the form of digital packet data, and therefore the communicator 120 extracts the video data from the content signal without transferring the content signal to the deMUX 132, thereby transmitting the video data to the video decoder 133.

By the way, as illustrated in this example embodiment, a procedure of processing a content signal in the broadcast network is more complicated than that in the broadband network. Accordingly, it takes a relatively long time to process a content signal of the broadcast network.

Figure 4:
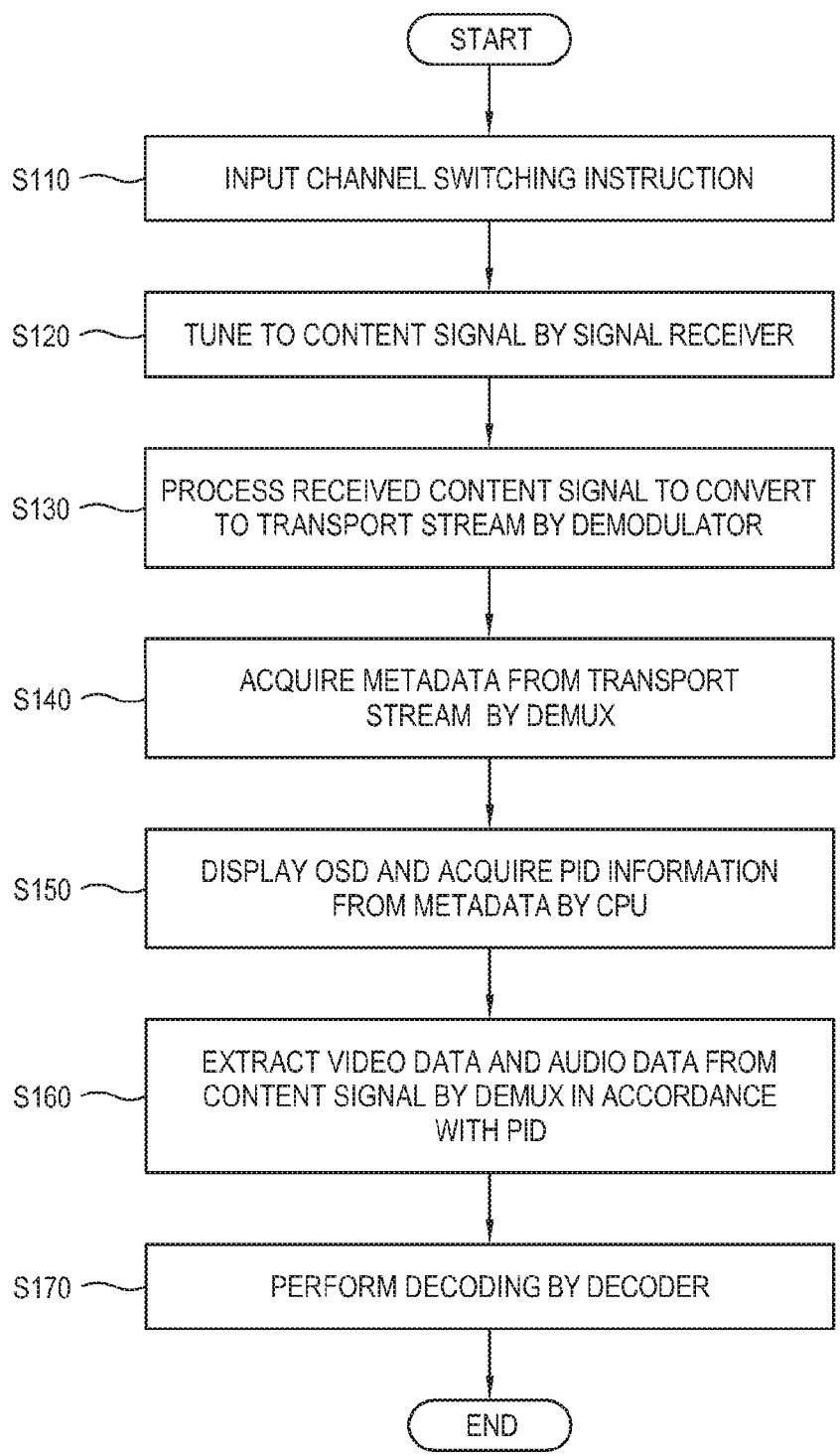
FIG. 4 is a flowchart illustrating an example of processing a content signal received by a broadcast network in the image processing apparatus according to a first example embodiment.

FIG. 4 is a flowchart illustrating an example of processing a content signal received by a broadcast network in the image processing apparatus according to the first example embodiment;

As illustrated in FIG. 4, at operation S110 the image processing apparatus receives an input, e.g., a user input, providing a channel switching instruction.

At operation S120 the signal receiver is tuned to a frequency of a switched channel for a content signal.

At operation S130 the demodulator processes the received content signal to be converted into a transport stream. Although it may be varied depending on the internal conditions of the image processing apparatus, it takes about 300 ms from the operation S120 to the operation S130 in a general image processing apparatus.

At operation S140 the deMUX acquires metadata from the transport stream. It takes about 200 ms to implement the operation S140.

At operation S150 the CPU displays an on screen display (OSD) showing a channel number of the switched channel, and acquires PID information from the metadata. This operation takes about 100 ms.

At operation S160 the deMUX extracts video data and audio data from the content signal in accordance with the PID information.

At operation S170 the video decoder and the audio decoder perform decoding. The video decoder buffers the video data for a predetermined period of time, and finds an I-frame or an IDR frame within content, thereby performing the decoding with respect to this frame. It takes about 500 to 1000 ms up to the operation S170 after the operation S160.

In case of a video compression format, the following methods are used to make a compression ratio higher. In the video compression format, all frames for an image are not respectively compressed, but one frame is compressed to be independently decoded and then error or estimated values are encoded with respect to the other frames. Here, an independently decodable frame will be called a key frame or a key picture, and this frame will be also called the I-frame in case of MPEG or the IDR frame in case of H.264. The frame encoded with the error value or estimated value is a frame to be decoded by allowing for another frame, which includes a B-frame and a P-frame.

That is, when the decoder finds a specific point of video data desired to be played, it is difficult to play the video data if the frame at the corresponding point is the B-frame or the P-frame. In the case of H.264, the IDR frame is embedded at intervals of 0.5 to 2 seconds for predetermined play, and therefore the decoder moves to the IDR frame preceding the corresponding point and performs decoding.

Like this, a time delay of at least 1100 ms occurs from time when a user inputs the channel switching instruction to time when an image of a channel switched by decoding of the decoder is displayed, and thus no image section where nothing is displayed is generated. If the no-image period becomes longer, it will be inconvenient for a user. In particular, if the image processing apparatus processes a content signal received through the broadcast network, there is a need of decreasing the no-image period as short as possible. Details of this will be described in greater detail below.

Below, the metadata extracted from the content signal by the deMUX will be described.

Figure 5:
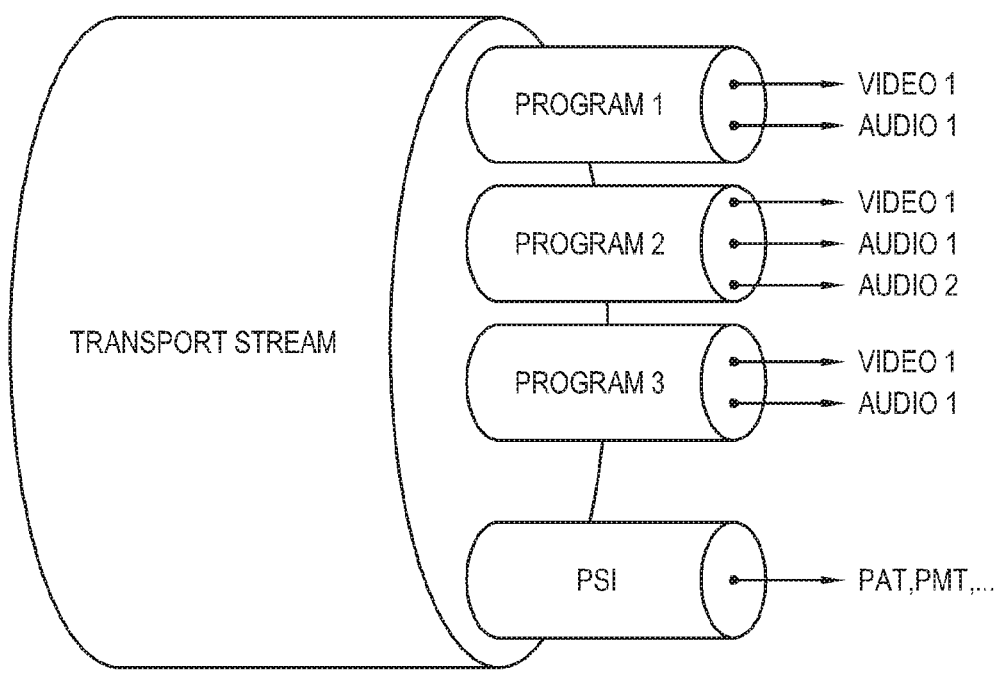
FIG. 5 is a diagram illustrating an example of a packaged form of a transport stream to be processed in the image processing apparatus according to a first example embodiment.

FIG. 5 is a diagram illustrating an example of a packaged form of a transport stream to be processed in the image processing apparatus according to the first example embodiment;

As illustrated in FIG. 5, the transport stream has a form where metadata and programs according to a plurality of channels are packaged. Each program includes one or more pieces of video and audio data. In accordance with the programs, there may be two or more pieces of video and audio data.

The metadata may have various forms. For example, there are PSI and PSIP. The PSI refers to metadata where program information needed for demultiplex is tabulated in terms of demultiplexing the transport stream multiplexed by programs according to the plurality of channels. The PSI is repetitively transmitted at regular time intervals as it is embedded in a payload of the transport stream.

The PSI includes many tables so as to find a specific program within a complicated structure of the transport stream. For example, the PSI includes a program association table (PAT), a program map table (PMT), a conditional access table (CAT), a transport stream description table (TSDT), an IPMP control information table (ICIT), etc.

The PAT is a list of all the programs multiplexed in the transport stream, and records a program number, a PID of the PMT, etc.

The PMT records components of a program, e.g., the PID and the formats of video and audio data, etc. That is, the PID information for extracting the video data and the audio data in the program is obtained from the PMT.

In addition, the PSIP shows information about a structure of the transport stream, and is a set of hierarchical tables standardized in advanced television system committee (ATSC) for describing system and program schedule information, etc. The PSIP provides broadcast channel information, time information, location information, content rating information, a broadcast program guide, etc.

Besides, metadata may provide the kind of codecs for decoding the video data, resolution information, etc.

Below, a method of decreasing the no-image period will be described.

Figure 6:
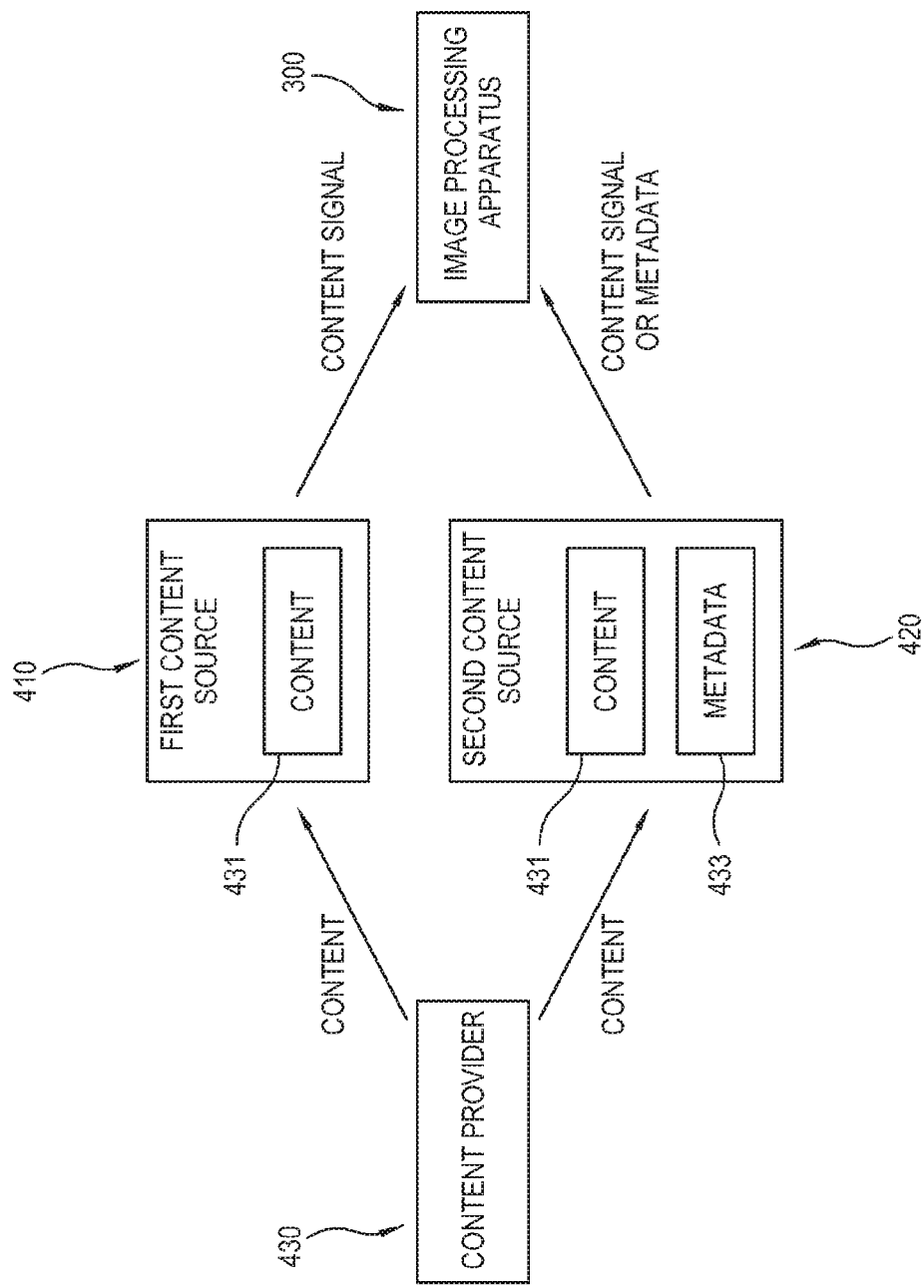
FIG. 6 is a block diagram illustrating an example principle of a system that provides a content signal to an image processing apparatus according to a second example embodiment.

FIG. 6 is a block diagram illustrating an example principle of a system that provides a content signal to an image processing apparatus 300 according to a second example embodiment.

As illustrated in FIG. 6, the image processing apparatus 300 according to the second example embodiment can receive a content signal from a first content source 410 through the broadcast network, and receive a content signal from a second content source 420 through the broadband network.

There are no limits to the first content source 410 and the second content source 420. For example, the first content source 410 may be achieved by a transmitter of a broadcasting station, and the second content source 420 may be achieved by a server connected to the Internet.

Content 431 provided by a predetermined content provider 430 is sent to the first content source 410 and the second content source 420, and the first content source 410 and the second content source 420 generate content signals by their own methods and provide the content signals to the image processing apparatus 300. Further, the second content source 420 may generate a content signal by receiving content 431 from the first content source 410. That is, the content signals respectively provided by the first content source 410 and the second content source 420 include the same content 431.

The first content source 410 provides the content signal based on the content 431 through the broadcast network. On the other hand, the second content source 420 provides the content signal based on the content 431 through the broadband network, and further provides metadata 433 of the content signal.

Figure 7:
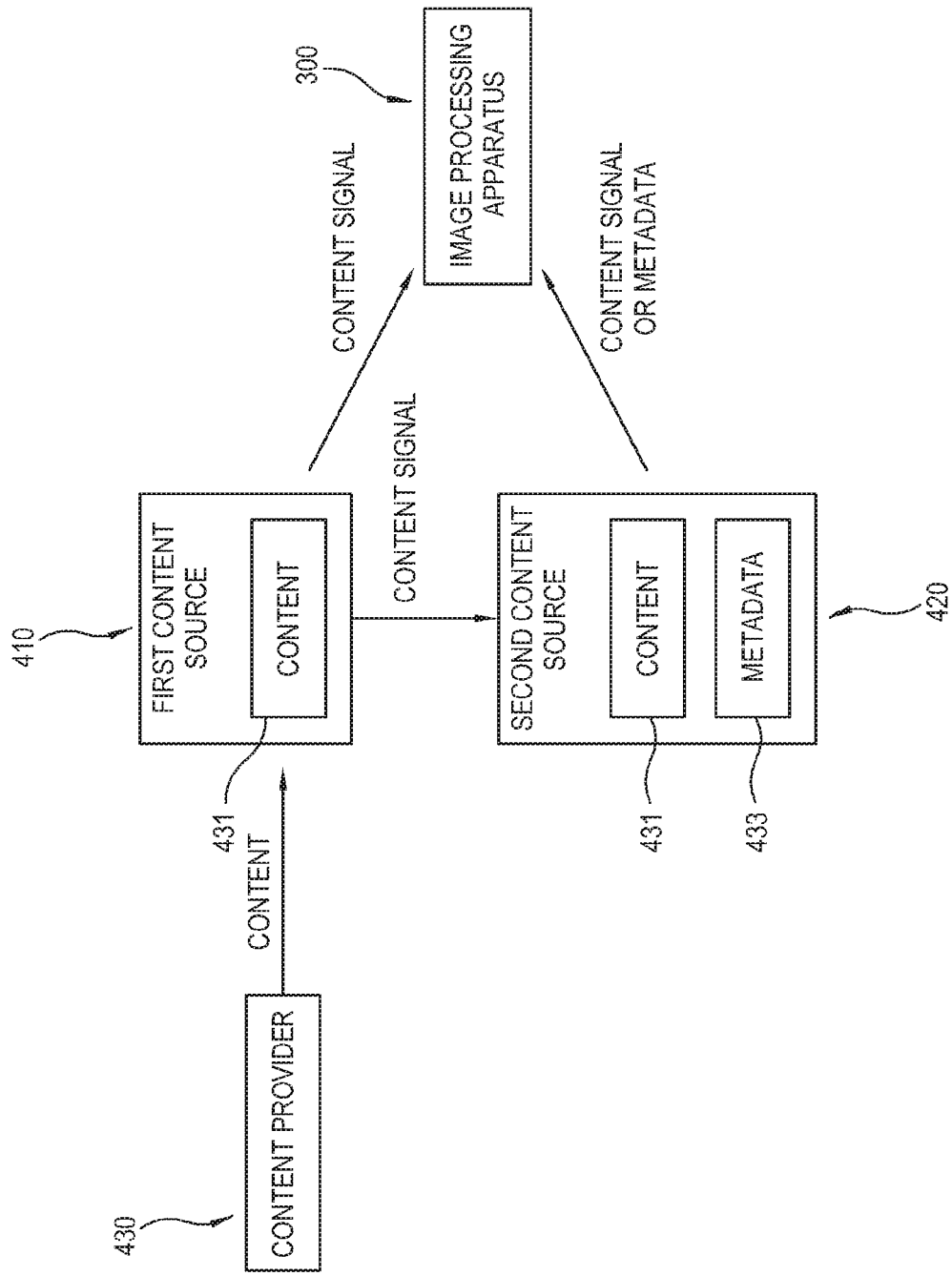
FIG. 7 is a block diagram illustrating another example principle of a system that provides a content signal to the image processing apparatus according to a second example embodiment.

FIG. 7 is a block diagram illustrating another example principle of a system that provides a content signal to the image processing apparatus 300 according to the second example embodiment;

As illustrated in FIG. 7, the first content source 410 transmits a content signal to the image processing apparatus 300 through the broadcast network, and the second content source 420 transmits a content signal to the image processing apparatus 300 through the broadband network.

A predetermined content provider 430 provides content 431 to the first content source 410. The first content source 410 generates a content signal based on the content 431, and provides the content signal to the second content source 420. The second content source 420 processes the content signal provided by the first content source 410, and stores the content 431 and the metadata 433 of the content signal. The second content source 420 may convert the content signal to be provided to the image processing apparatus 300 through the broadband network while processing the content signal.

As illustrated above in FIG. 6 and FIG. 7, the image processing apparatus 300 has multiple ways of acquiring the metadata 433 of the content signal. As one of the ways, the image processing apparatus 300 receives a content signal from the first content source 410 through the broadcast network, and primarily demultiplexes the content signal to extract the metadata 433 from the content signal. As the other one of the ways, the image processing apparatus 300 may acquire previously prepared metadata 433 from the second content source 420 without demultiplexing the content signal.

The image processing apparatus 300 can receive a content signal from either of the first content source 410 or the second content source 420, but the broadcast and broadband network environments for transmitting the content signal may be different from each other. For example, if the broadband network environment is worse than the broadcast network environment, it is advantageous for the image processing apparatus 300 to receive a content signal including video data of high picture quality having a resolution of 4K or higher from the first content source 410 rather than the second content source 420

As mentioned above, to process a content signal received through the broadcast network, the image processing apparatus 300 performs a primary demultiplexing process for extracting the metadata 433 from the content signal, and then performs a secondary demultiplexing process for acquiring PID from the metadata 433 and extracting video data from a transport stream. To perform the second demultiplexing process, it is necessary for acquiring the PID information from the metadata 433. In the foregoing first example embodiment, the primary demultiplexing process for acquiring the metadata 433 is performed, and thus channel switching is delayed as much as time corresponding to the primary demultiplexing process.

Thus, the image processing apparatus 300 according to this example embodiment acquires and uses the metadata 433 from the second content source 420 instead of performing the primary demultiplexing process for extracting the metadata 433 from a content signal if the content signal is received from the first content source 410 through the broadcast network. Thus, the image processing apparatus 300 can shorten the time taken in extracting the metadata 433 from the content signal and acquiring the PID from the extracted metadata 433. In result, the image processing apparatus 300 can reduce the time delay when the channel is switched over.

Below, it will be described that the image processing apparatus 300 receives a content signal through the broadcast network and switches a channel in response to a user's instruction.

Figure 8:
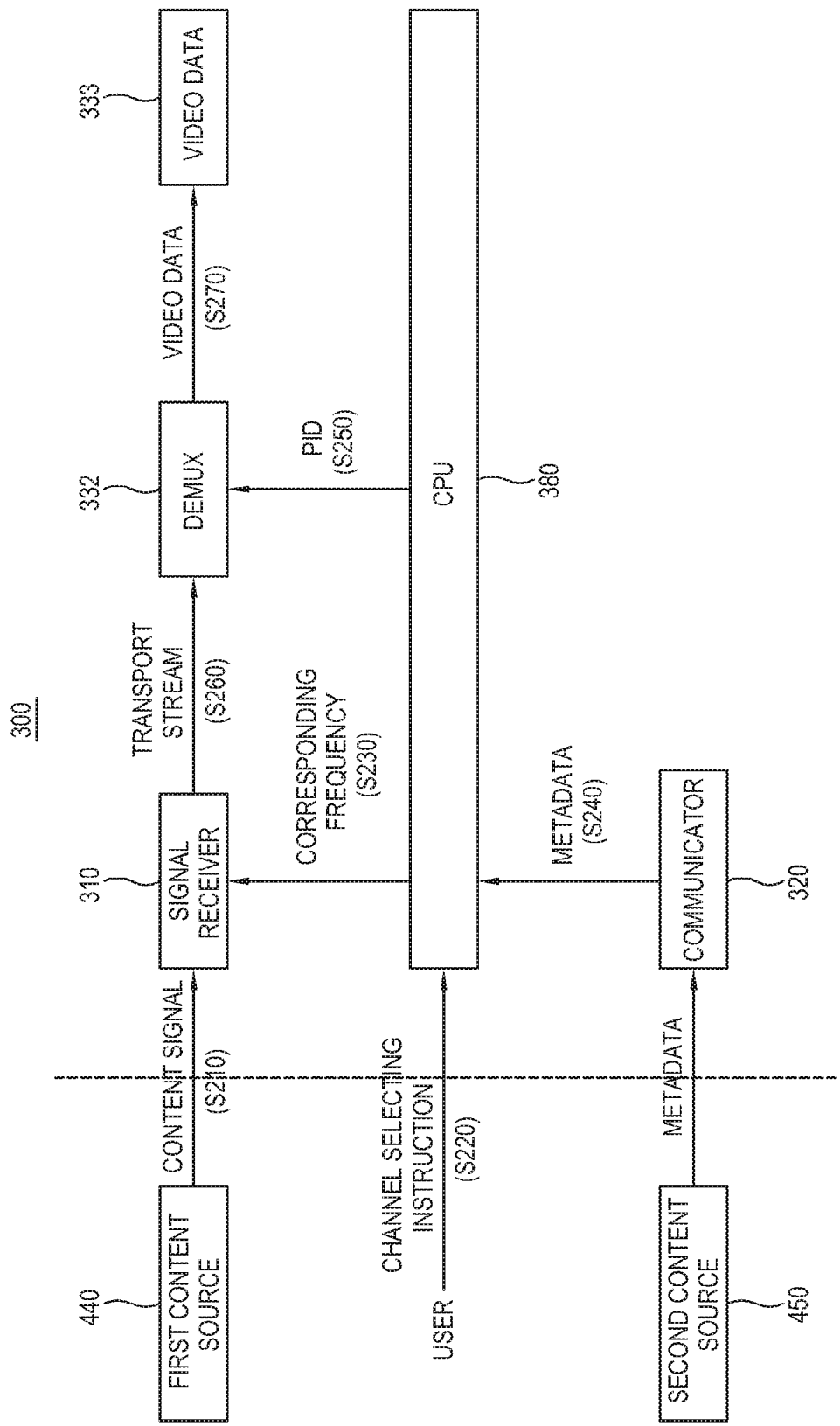
FIG. 8 is a diagram illustrating an example procedure of selecting a channel of a content signal received by the broadcast network in the image processing apparatus according to a second example embodiment.

FIG. 8 is a diagram illustrating an example procedure of selecting a channel of a content signal received by the broadcast network in the image processing apparatus 300 according to the second example embodiment.

As illustrated in FIG. 8, the image processing apparatus 300 in this example embodiment includes a signal receiver 310, a communicator (e.g., including communication circuitry) 320, a deMUX 332, and a video decoder 333, and a CPU 380. The elements of the image processing apparatus 300 in this embodiment are equivalent to those of the first example embodiment, and thus repetitive descriptions thereof may be omitted. In this example embodiment, distinct features in the procedure of processing the content signal will be described.

At operation S210 the signal receiver 310 receives a content signal from a first content source 440 through the broadcast network.

At operation S220 the CPU 380 receives a channel selecting instruction input by a user.

At operation S230 the CPU 380 acquires a frequency corresponding to a selected channel from a previously stored channel map in response to the channel selecting instruction, and transfers the acquired frequency to the signal receiver 310.

At operation S240 the CPU 380 receives and stores metadata from the second content source 450 through the communicator 320 in response to the channel selecting instruction.

At operation S250 the CPU 380 acquires PID from the metadata and provides the PID to the deMUX 332.

At operation S260 the deMUX 332 receives the transport stream from the signal receiver 310. In this example embodiment, although it is skipped, the content signal output from the signal receiver 310 is converted into a transport stream by the demodulator (not shown), and the transport stream is transferred to the deMUX 332.

At operation S270 the deMUX 332 extracts the video data from the transport stream based on the PID received from the CPU 380, and provides the video data to the video decoder 333.

In this manner, the CPU 380 of the image processing apparatus 300 receives a user's channel selecting instruction with regard to a content signal from the first content source 440, provides the signal receiver 310 with a frequency corresponding to a channel selected in response to the channel selecting instruction, and receives the metadata about the content signal from the first content source 440 through the communicator 320.

Thus, the deMUX 332 directly enters the procedure of extracting the video data from the transport stream without extracting the metadata from the content signal. Thus, it is possible to shorten time taken until a channel image is displayed in response to a user's channel selecting instruction. In other words, it is possible to reduce the no-image period.

In this example embodiment, the metadata acquired from the second content source 450 by the CPU 380 may refer, for example to metadata corresponding to the channel selected by a user among all channels involved in the content signal. Since the channel information of the content signal may be dynamically varied, it may be advantageous for the CPU 380 to receive only data needed at this point in time from the second content source 450 in consideration of communication environments. In case where the metadata is received and stored corresponding to all the channels, the previously stored metadata is useless when there is a change in channel programming of the content signal.

However, if the channel information of the content signal is not frequently changed and the broadband network environment is not bad, the CPU 380 may receive and store the metadata corresponding to all the channels in the content signal and then use the previously stored metadata in channel switching. Below, an example embodiment related to this will be described.

Figure 9:
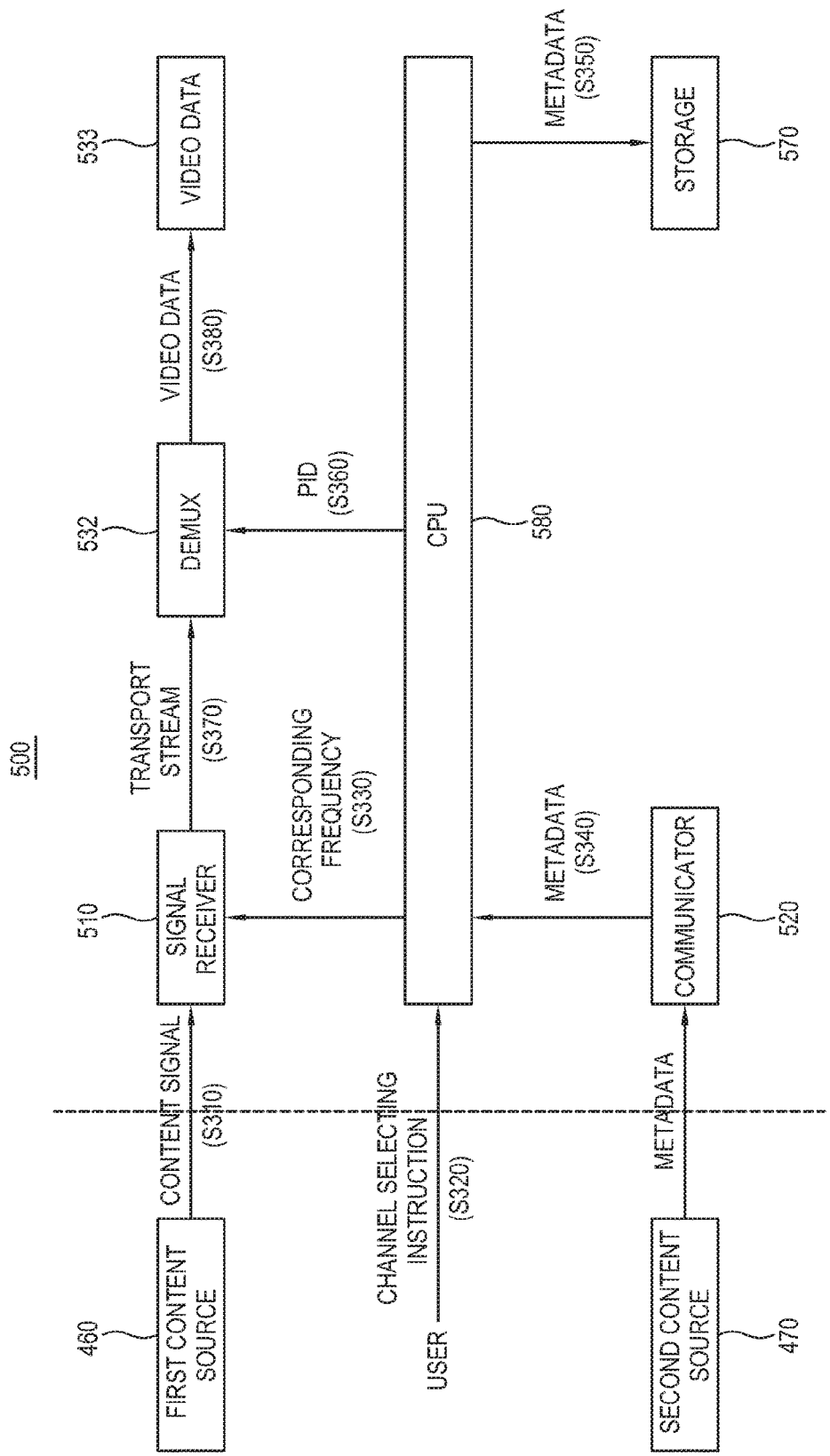
FIG. 9 is a diagram illustrating an example procedure of selecting a channel of a content signal received by the broadcast network in an image processing apparatus according to a third example embodiment.

FIG. 9 is a diagram illustrating an example procedure of selecting a channel of a content signal received by the broadcast network in an image processing apparatus 500 according to a third example embodiment.

In this example embodiment, distinct features in the procedure of processing the content signal will be described.

As illustrated in FIG. 9, the image processing apparatus 500 according to the third example embodiment includes a signal receiver 510, a communicator (e.g., including communication circuitry) 520, a deMUX 532, a video decoder 533, a storage 570 and a CPU 580. The elements of the image processing apparatus 500 in this embodiment are equivalent to those of the first example embodiment, and thus repetitive descriptions thereof may be omitted. In this example embodiment, distinct features in the procedure of processing the content signal will be described.

At operation S310 the signal receiver 510 receives a content signal from a first content source 460 through the broadcast network.

At operation S320 the CPU 580 receives a channel selecting instruction input by a user.

At operation S330 the CPU 580 acquires a frequency corresponding to a channel selected from a previously stored channel map in response to the channel selecting instruction and transfers the acquired frequency to the signal receiver 510.

At operation S340 the CPU 580 receives metadata from a second content source 470 through the communicator 520 by the broadband network in response to the channel selecting instruction. On the contrary to the second example embodiment, this metadata is related to all the channels involved in the content signal received from the first content source 460.

At operation S350 the CPU 580 acquires PID from the metadata, and stores the metadata in the storage 570.

At operation S360 the CPU 580 provides the acquired PID to the deMUX 532.

At operation S370 the deMUX 532 receives the transport stream from the signal receiver 510. In this example embodiment, although it is skipped, the content signal output from the signal receiver 510 is converted into the transport stream by the demodulator (not shown) and then transferred to the deMUX 532.

At operation S380 the deMUX 532 extracts video data from the transport stream based on the PID provided by the CPU 580, and provides the video data to the video decoder 533.

Figure 10:
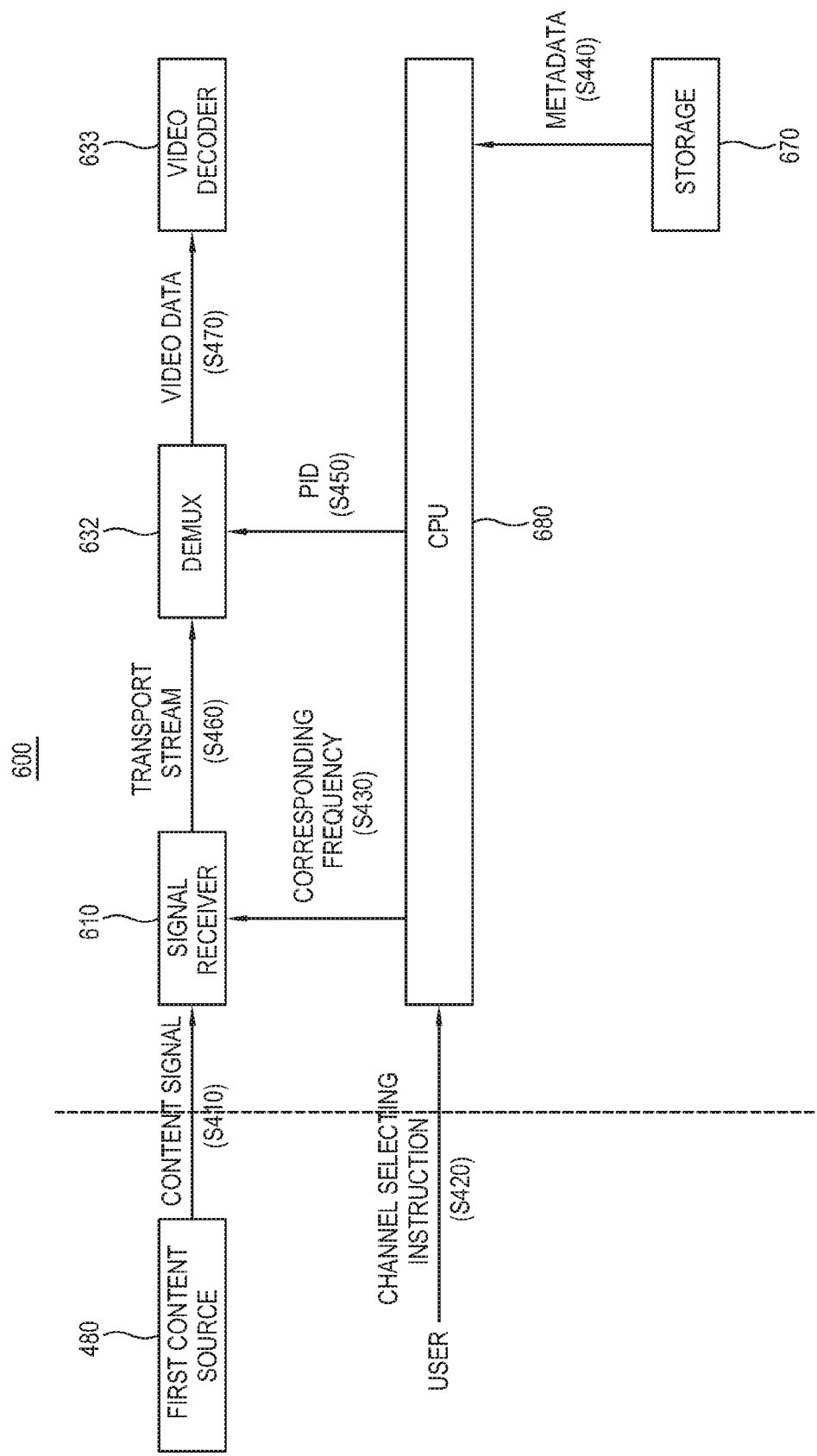
FIG. 10 is a diagram illustrating an example procedure of selecting a channel of a content signal received by the broadcast network in the image processing apparatus according to a third example embodiment after the procedure of FIG. 9.

FIG. 10 is a diagram illustrating an example procedure of selecting a channel of a content signal received by the broadcast network in an image processing apparatus 600 according to the third example embodiment after the procedure of FIG. 9.

As illustrated in FIG. 10, at operation S410 a signal receiver 610 receives a content signal from a first content source 480 though the broadcast network.

At operation S420 the CPU 680 receives a channel selecting instruction input by a user.

At operation S430 the CPU 680 acquires a frequency corresponding to a selected channel from the previously stored channel map in response to the channel selecting instruction, and transfers the acquired frequency to the signal receiver 610.

The CPU 680 determines whether the metadata related to all the channels of the content signal is stored in the storage 670 in response to the channel selecting instruction. If this metadata is not stored in the storage 670, the operations are the same as those described above with reference FIG. 9. On the other hand, if this metadata is stored in the storage 670 as the operations described with reference to FIG. 9 are previously performed, at operation S440 the CPU 680 calls the metadata from the storage 670.

At operation S450 the CPU 680 acquires the PID from the metadata called from the storage 670, and provides the acquired PID to the deMUX 632.

At operation S460 the deMUX 632 receives the transport stream from the signal receiver 610. In this example embodiment, although it is skipped, the content signal output from the signal receiver 610 is converted into the transport stream by the demodulator (not shown) and then transferred to the deMUX 632.

At operation S470 the deMUX 632 extracts the video data from the transport stream based on the PID provided by the CPU 680, and provides the video data to the video decoder 633.

With this procedure, the image processing apparatus 600 receives and stores the metadata of the whole content signal, and uses the previously stored metadata when a channel is selected in the future, thereby shortening the time taken in acquiring the PID.

The image processing apparatus may have many methods to access the second content source that provides the content signal or metadata through the broadband network. Below, an embodiment about one of these methods will be described.

Figure 11:
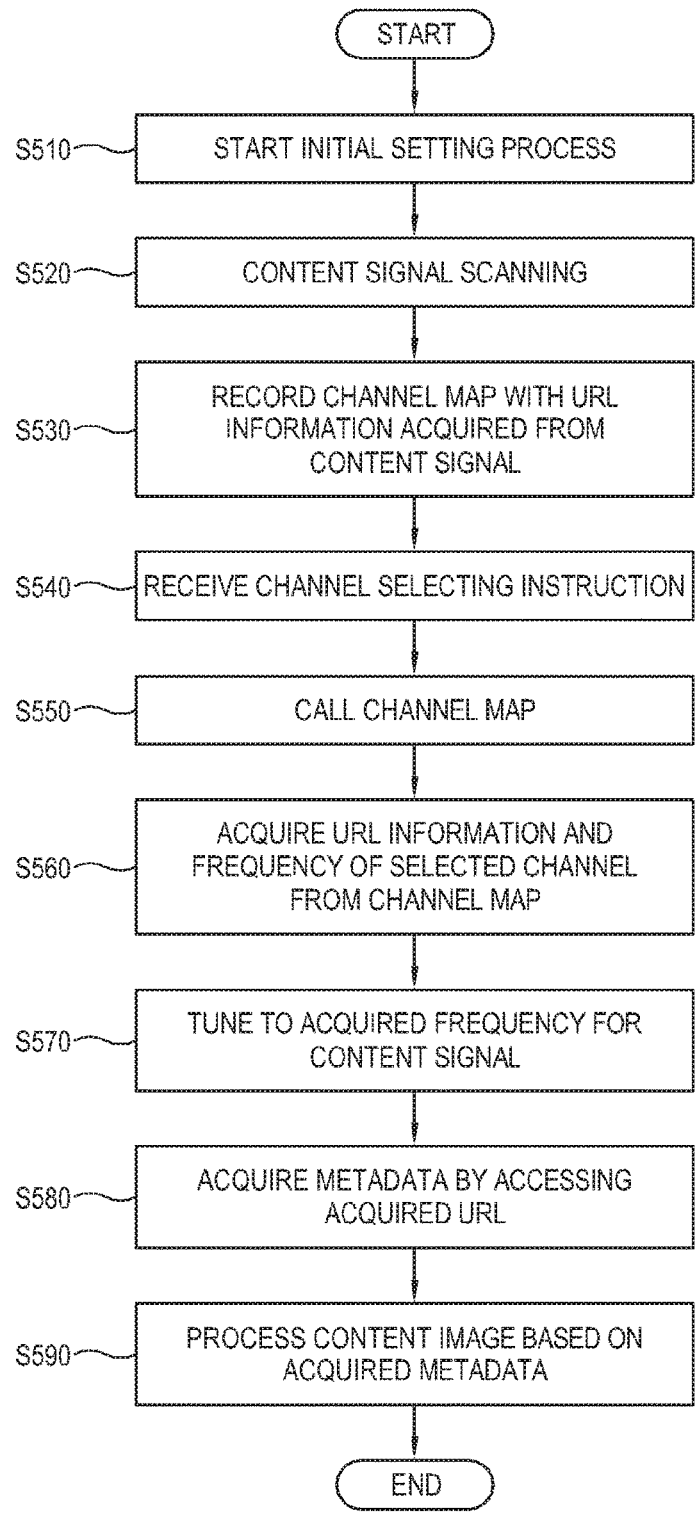
FIG. 11 is a flowchart illustrating an example of acquiring metadata of a specific channel from a second content source by an image processing apparatus according to a fourth example embodiment.

FIG. 11 is a flowchart illustrating an example of acquiring metadata of a specific channel from a second content source by an image processing apparatus according to a fourth example embodiment.

As illustrated in FIG. 11, at operation S510 if the image processing apparatus is turned on for the first use, an initial setting process begins for setting use environment.

At operation S520 the image processing apparatus performs a process of scanning a content signal received from the first content source to generate and store a channel map during the initial setting process. The first content source transmits the content signal to the image processing apparatus through the broadcast network, and the content signal includes information such as uniform resource locator (URL) information about where metadata is stored in the second content source.

At operation S530 the image processing apparatus acquires such a URL from the content signal while scanning the content signal, and records the URL in the channel map. Information about such a URL may be provided according to metadata of each channel, or may indicate an address where metadata of all the channels is stored in a lump.

At operation S540 the image processing apparatus receives the channel selecting instruction from a user.

At operation S550 the image processing apparatus calls the channel map in response to the channel selecting instruction.

At operation S560 the image processing apparatus acquires a frequency of a selected channel and URL information from the channel map.

At operation S570 the image processing apparatus is tuned to the acquired frequency for the content signal.

At operation S580 the image processing apparatus accesses the acquired URL and acquires metadata from the second content source.

At operation S590 the image processing apparatus processes the content signal based on the acquired metadata.

In this manner, the image processing apparatus acquires the metadata corresponding to the selected channel from the second content source.

In addition, it is possible to further reduce the no-image period while using the foregoing method of receiving the metadata from the second content source through the broadband network instead of the first content source providing the content signal through the broadcast network. Below, an embodiment about this will be described.

Figure 12:
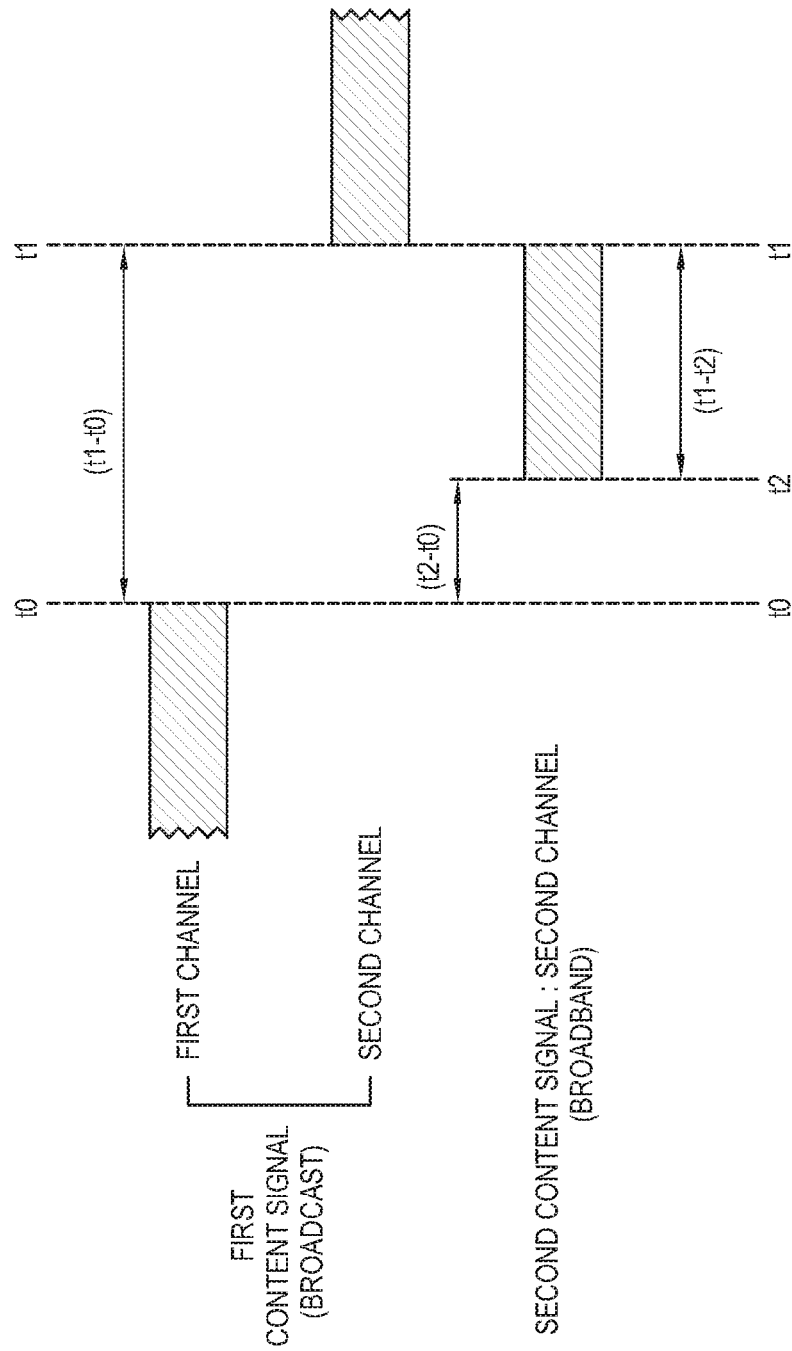
FIG. 12 is a diagram illustrating an example principle of switching a channel of a content signal received by the broadcast network in an image processing apparatus according to a fifth example embodiment.

FIG. 12 is a diagram illustrating an example principle of switching a channel of a content signal received by the broadcast network in an image processing apparatus according to a fifth example embodiment.

As illustrated in FIG. 12, the image processing apparatus according to the fifth example embodiment receives a first content signal from a first content source and is tuned to a first channel in the first content signal, thereby processing the first channel image to be displayed.

While the image processing apparatus is displaying a first channel image, a user inputs an instruction for switching over to a second channel in the first content signal at a point in time t0. In response to this instruction, the image processing apparatus performs a process for switching over from the first channel to the second channel, and displays an image of the second channel at a point in time t1. This channel switching process is equivalent to those of the foregoing example embodiments, and thus repetitive descriptions thereof will be avoided.

The time interval t1-t0 is the no-image period during which an image of any channel is not displayed. By the method described in the second example embodiment, it is possible to make the time interval t1-t0 narrower than that of the conventional case. However, even though the method according to the second example embodiment is applied, time is required to receive metadata through the broadband network in the image processing apparatus, and process the first content signal based on the metadata. Therefore, if an image of the second channel is displayed before the point in time t1, it will be possible to shorten the no-image period, e.g., the time interval t1-t0.

Thus, the image processing apparatus according to this embodiment employs the following methods.

The image processing apparatus receives a user's instruction for switching over to the second channel at a point in time t0 while displaying the first channel image of the first content signal received from the first content source through the broadcast network. In response to this response, the image processing apparatus performs a process for switching over from the first channel to the second channel in the first content signal received through the broadcast network.

Further, the image processing apparatus receives a second content signal from the second content source through the broadband network. Here, the first content signal and the second content signal are just given to represent signals provided from different content sources. The same content is contained in the second content signal received from the second content source and the first content signal received from the first content source. The image processing apparatus may receive the second content signal while receiving the metadata from the second content source.

The image processing apparatus processes the second content signal received from the second content source and displays a second channel image at a point in time t2 within the time interval t1-t0. The second content signal received through the broadband network does not have to undergo demodulating and demultiplexing unlike the first content signal received through the broadcast network. Therefore, the image processing apparatus may display the second channel image of the second content signal received through the broadband network, prior to the second channel image of the first content signal received through the broadcast network.

The time interval t2-t0 refers to a period of time during which the image processing apparatus receives and processes the second content signal from the second content source through the broadband network to display the second channel image. From the point in time t2, the image processing apparatus displays the second channel image based on the second content signal while performing the channel switching process for the first content signal.

If the channel switching process for the first content signal is completed at the point in time t1, the image processing apparatus stops displaying the second channel image based on the second content signal and starts displaying the first channel image based on the first content signal.

According to this example embodiment, it is possible to display the second channel image of the second content signal provided through the broadband network during the time interval t1-t2 within the conventional no-image period t1-t0. Thus, the image processing apparatus in this embodiment minimizes and/or reduces the no-image period caused by channel switching.

Figure 13:
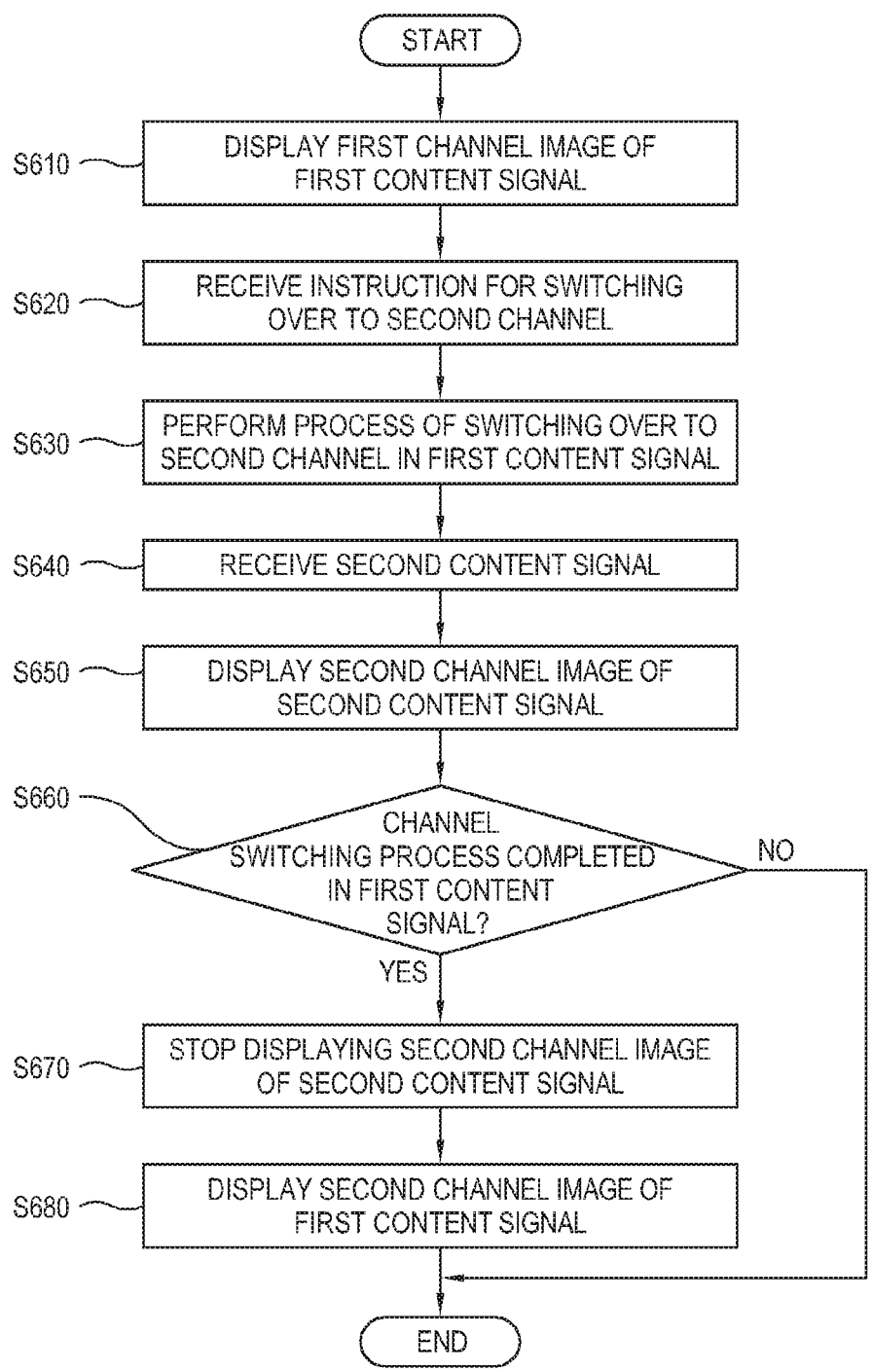
FIG. 13 is a flowchart illustrating an example of switching over from a first channel to a second channel in response to a channel switching instruction in the image processing apparatus according to a fifth example embodiment.

FIG. 13 is a flowchart illustrating an example of switching over from a first channel to a second channel in response to a channel switching instruction in the image processing apparatus according to the fifth example embodiment.

As illustrated in FIG. 13, at operation S610 the image processing apparatus displays the first channel image of the first content signal received from the first content source through the broadcast network.

At operation S620 the image processing apparatus receives an instruction, for example, a user's instruction, for switching over to the second channel.

At operation S630 the image processing apparatus performs the process for switching over from the first channel to the second channel in the first content signal in response to the switching instruction. This process is equivalent to that of the foregoing example embodiments, and thus repetitive descriptions will be avoided as necessary.

At operation S640 the image processing apparatus receives the second content signal from the second content source through the broadband network in response to the switching instruction.

At operation S650 the image processing apparatus processes the second content signal and displays the second channel image. While the operation S640 and the operation S650 are performed, the image processing apparatus continues to perform the operation S630.

At operation S660 the image processing apparatus determines whether the process for switching over from the first content signal to the second channel is completed. If it is determined that this process is not completed, the image processing apparatus continues monitoring until the process is completed.

If it is determined that the process is completed, at operation S670 the image processing apparatus terminates displaying the second channel image of the second content signal.

At operation S680 the image processing apparatus displays the second channel image of the first content signal.

In this manner, when the first channel is switched over to the second channel in the first content signal received through the broadcast network, it is possible to minimize the time during which no image is displayed.

When the image processing apparatus switches over from the second channel image of the second content signal to the second channel image of the first content signal at a point in time, synchronization is needed between image scenes of two content signals. That is, the image processing apparatus has to determine scenes of corresponding time stamps so that a scene in a second channel image of a second content signal can be connected to a scene in a second channel image of a first content signal without discontinuity at the switching time. Below, an embodiment about this will be described.

Figure 14:
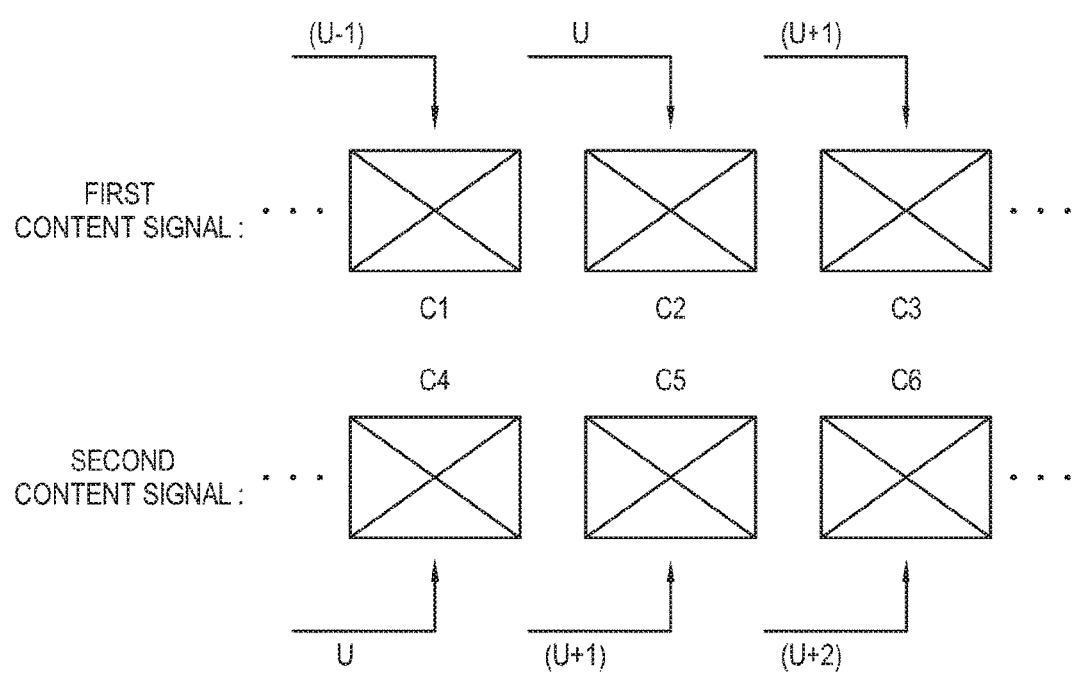
FIG. 14 is a diagram illustrating an example principle of synchronization between a scene of a certain channel of a first content signal and a scene of the same channel of a second content signal in an image processing apparatus according to a sixth example embodiment.

FIG. 14 is a diagram illustrating an example principle of synchronization between a scene of a certain channel of a first content signal and a scene of the same channel of a second content signal in an image processing apparatus according to a sixth example embodiment.

As illustrated in FIG. 14, the image processing apparatus according to the sixth example embodiment receives a first content signal from the first content source through the broadcast network, and also receives a second content signal from the second content source through the broadband network. In this example embodiment, the first content signal and the second content signal are just given to represent two signals provided from different content sources. The same content is contained in the second content signal and the first content signal. For example, the first content signal and the second content signal include programs of the same channels.

In the same channel of the first content signal and the second content signal, each scene or each video frame includes information about a time stamp. The time stamp refers to a point in time where a certain scene of a channel program is displayed.

There are many cases of what units of time the time stamp uses. The simplest case is that the first content signal and the second content signal use the same units of time. For example, the scenes of the first content signal and the second content signal may have the time stamps based on universal time coordinated (UTC). The UTC refers to a standard time to keep a balance between international atomic time and Greenwich mean time, which is managed and published by International Bureau of Weights and Measures (BIPM).

For example, suppose that scenes C1, C2 and C3 are arranged in chronological order of the first content signal, and scenes C4, C5 and C6 are arranged in chronological order of the second content signal. The scenes C1, C2 and C3 respectively have the time stamps of (U−1), U and (U+1), and the scenes C4, C5 and C6 respectively have the time stamps of U, (U+1) and (U+2).

Let the scene at a certain point in time be C4 when it is desired to switch over to an image of the first content signal at this point in time while the image processing apparatus is displaying an image of the second content signal. The image processing apparatus checks that the scene C4 has the time stamp of U, and determines what scene has the same time stamp among the scenes of the first content signal. In this example embodiment, the scene C2 has the same time stamp of U as the scene C4.

The image processing apparatus determines the scene C2 having the same time stamp as the scene C4 among the scenes of the first content signal. In accordance with determination results, the image processing apparatus switches over from the image of the second content signal to the image of the first content signal.

For example, the image processing apparatus may switch over from the scene C4 to the scene C2 having the same time stamp as the scene C4 or to the scene C3 having the time stamp next to the scene C4. It is freely modifiable which scene is selected. In this embodiment, the image processing apparatus determines what scenes are matched between the different content signals based on the time stamps the scenes have.

Figure 15:
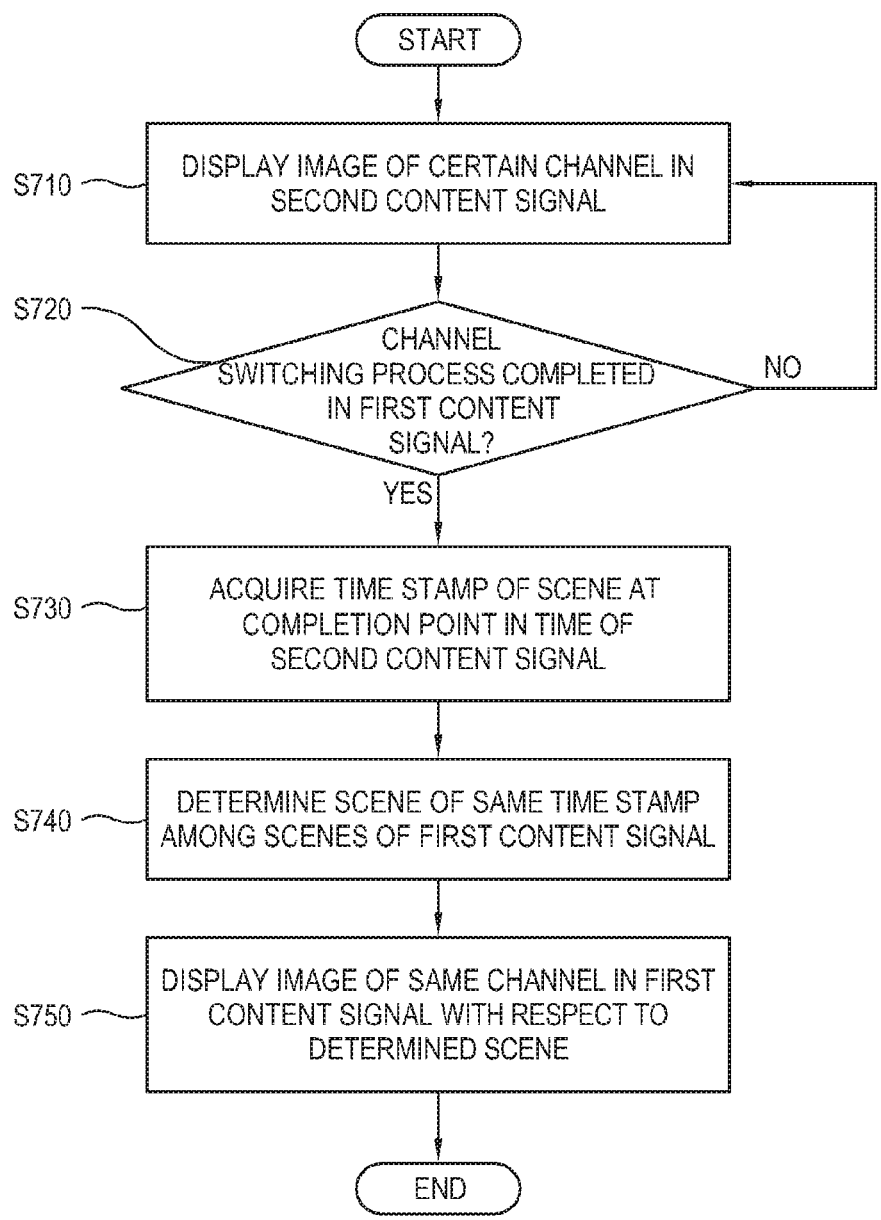
FIG. 15 is a flowchart illustrating an example switching method based on synchronization between an image of the second content signal and an image of the first content signal in the image processing apparatus according to a sixth example embodiment.

FIG. 15 is a flowchart illustrating an example switching method based on synchronization between an image of the second content signal and an image of the first content signal in the image processing apparatus according to the sixth example embodiment.

As illustrated in FIG. 15, at operation S710 the image processing apparatus displays an image of a certain channel of a second content signal.

At operation S720 the image processing apparatus determines whether a channel switching process of a first content signal is completed. If the channel switching process is not completed, the image processing apparatus continues monitoring until the channel switching process is completed.

If the channel switching process is completed, at operation S730 the image processing apparatus acquires the time stamp of the scene at a point in time when the second content signal is completed.

At operation S740 the image processing apparatus determines the scene having the same time stamp as the acquired time stamp among the scenes of the first content signal.

At operation S750 the image processing apparatus displays an image of the same channel in the first content signal with respect to the determined scene.

In this manner, the image processing apparatus can achieve synchronization in each scene between the first content signal and the second content signal.

According to this example embodiment, if the first content signal and the second content signal have the time stamps in the same units of time, the scenes having the same time stamps are matched with each other. On the other hand, the first content signal and the second content signal may have the respective time stamps in different units of time. Below, an embodiment about this will be described.

Figure 16:
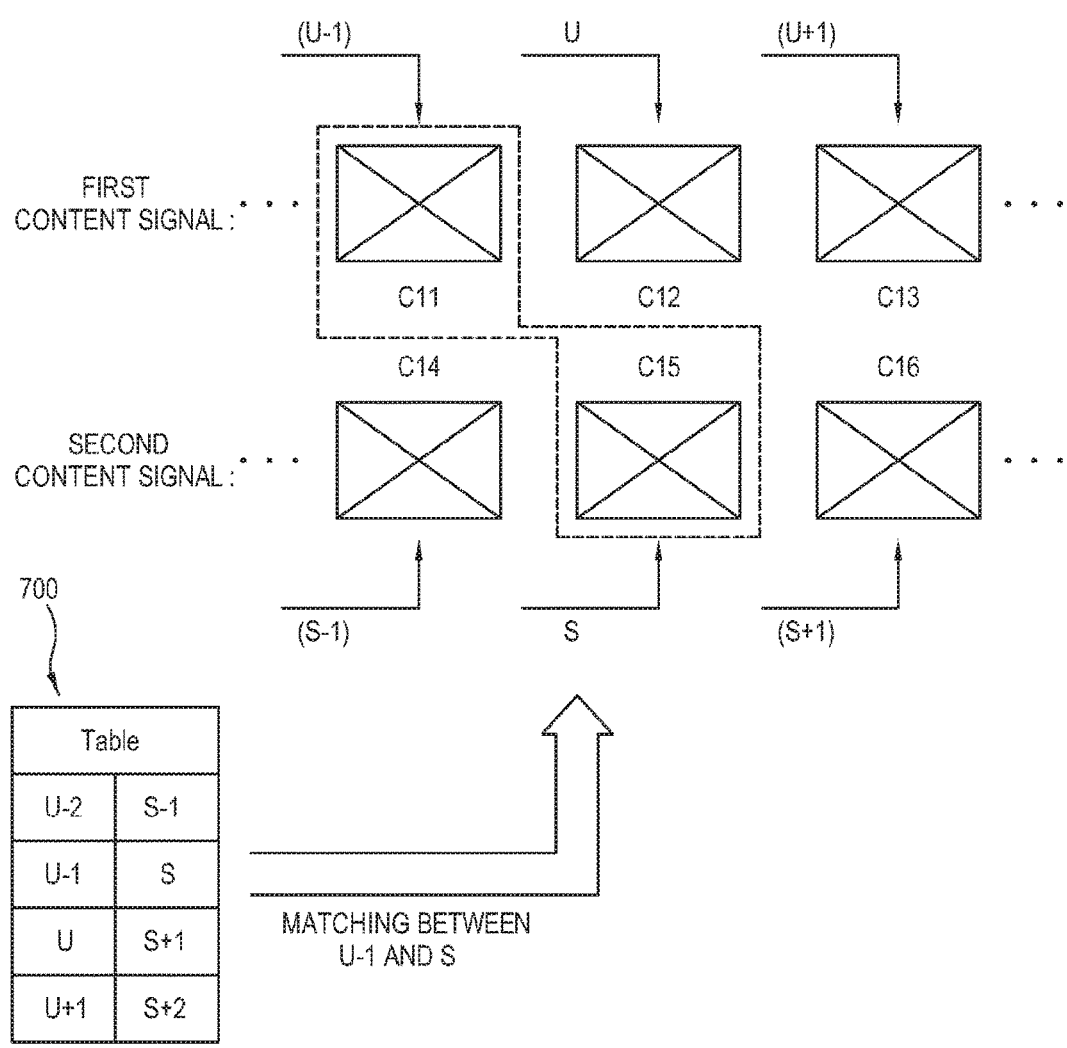
FIG. 16 is a diagram illustrating an example principle of synchronization between a scene of a certain channel of a first content signal and a scene of the same channel of a second content signal in an image processing apparatus according to a seventh example embodiment.

FIG. 16 is a diagram illustrating an example principle of synchronization between a scene of a certain channel of a first content signal and a scene of the same channel of a second content signal in an image processing apparatus according to a seventh example embodiment.

As illustrated in FIG. 16, the image processing apparatus according to the seventh example embodiment receives a first content signal from a first content source through the broadcast network, and receives a second content signal from a second content source through the broadband network. In this example embodiment, the first content signal and the second content signal are just given to represent two signals provided from different content sources. The same content is contained in the first content signal and the second content signal. For example, the first content signal and the second content signal include programs of the same channels.

In the same channel of the first content signal and the second content signal, each scene or each video frame includes information about a time stamp. The time stamp refers to a point in time where a certain scene of a channel program is displayed.

In this example embodiment, the second content signal has a UTC-based time stamp, but the first content signal has a system time clock (STC) based time stamp different from the UTC-based time stamp. The STC refers to a system clock of the time content source for generating and transmitting the first content signal.

For example, suppose that scenes C11, C12 and C13 are arranged in chronological order of the first content signal, and scenes C14, C15 and C16 are arranged in chronological order of the second content signal. The scenes C11, C12 and C13 respectively have the UTC-based time stamps of (U−1), U and (U+1), and the scenes C14, C15 and C16 respectively have the STC-based time stamps of (S−1), S and (S+1).

Let the scene at a certain point in time be C15 when it is desired to switch over to an image of the first content signal at this point in time while the image processing apparatus is displaying an image of the second content signal. On the contrary to the sixth example embodiment, since the time stamp of the first content signal and the time stamp of the second content signal in this embodiment are different in units of time, the image processing apparatus calls a table 700 where the matching time stamps between the first content signal and the second content signal are tabulated.

The table 700 is previously stored in the second content source, and the image processing apparatus receives the table 700 from the second content source. There are no limits to a point in time of receiving the table 700. For example, the image processing apparatus receives the table 700 together with the second content signal received for the first time from the second content source, or may receive the table 700 at a preset event of receiving metadata or the like.

The image processing apparatus searches the called table 700 for a time stamp of a scene in the first content signal corresponding to the time stamp S of the scene C15. If a time stamp of (U−1) is searched, the image processing apparatus determines the scene having the time stamp of (U−1) among the scenes in the first content signal.

Thus, it is easy for the image processing apparatus to determine that the scene C11 of the first content signal is synchronized with the scene C15 of the second content signal.

Figure 17:
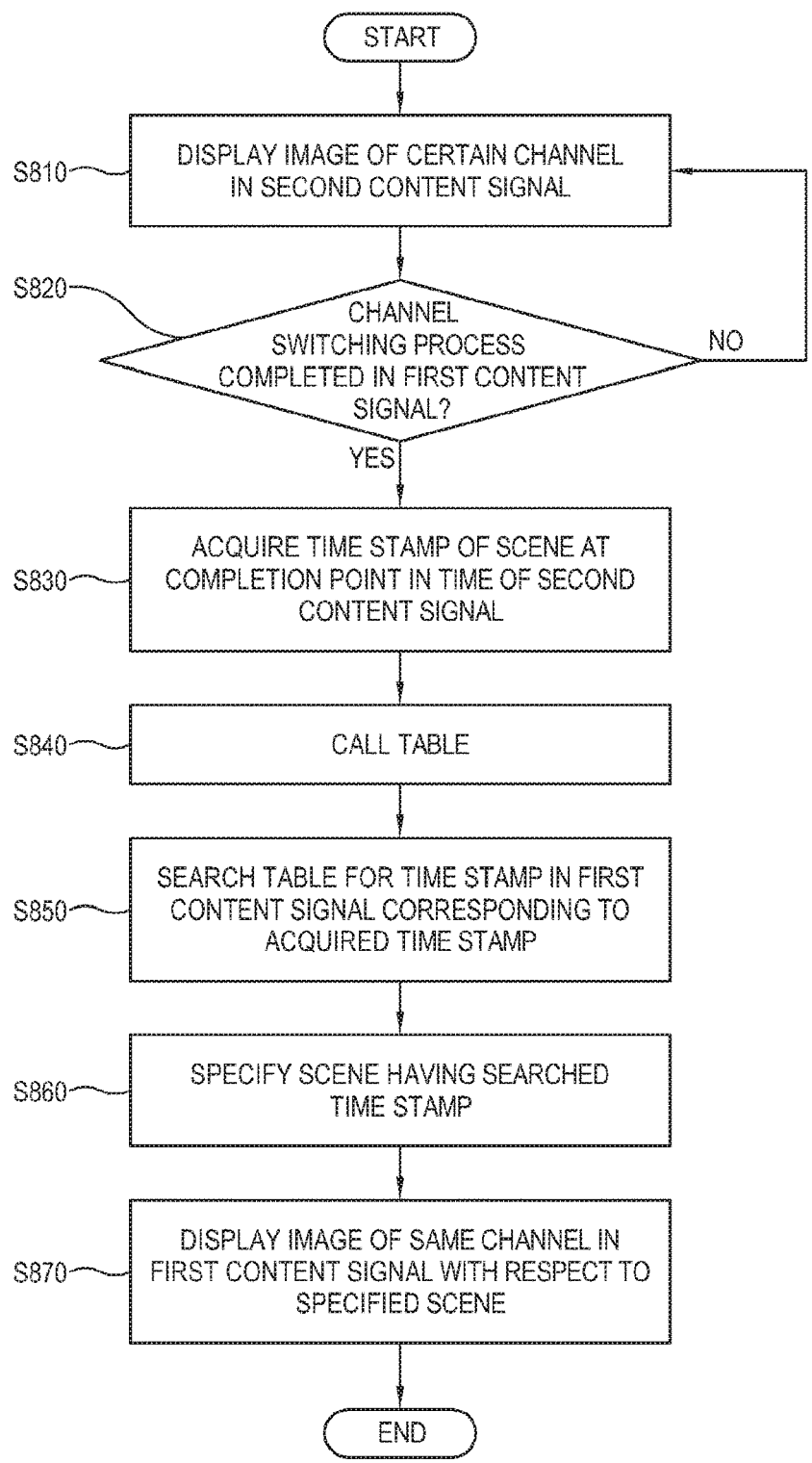
FIG. 17 is a flowchart illustrating an example switching method based on synchronization between an image of the second content signal and an image of the first content signal in the image processing apparatus according to a seventh example embodiment.

FIG. 17 is a flowchart illustrating an example switching method based on synchronization between an image of the second content signal and an image of the first content signal in the image processing apparatus according to the seventh example embodiment.

As illustrated in FIG. 17, at operation S810 the image processing apparatus displays an image of a certain channel of the second content signal.

At operation S820 the image processing apparatus determines whether a channel switching process of the first content signal is completed. If the channel switching process is not completed, the image processing apparatus continues monitoring until the process is completed.

When the channel switching process is completed, at operation S830 the image processing apparatus acquires a time stamp of the scene at a completion point in time of the second content signal.

At operation S840 the image processing apparatus calls the table where the time stamps matched between the second content signal and the first content signal are tabulated.

At operation S850 the image processing apparatus searches the table for a time stamp of the first content signal, which is matched with, e.g., corresponding to, the acquired time stamp.

At operation S860 the image processing apparatus specifies the scene of the first content signal having the searched time stamp.

At operation S870 the image processing apparatus displays an image of the same channel of the first content signal with respect to the specified scene.

In this manner, the image processing apparatus can achieve synchronization in each scene between the first content signal and the second content signal.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments. The program command recorded in this storage medium may be specially designed and configured according to the example embodiments, or may be publicly known and available to those skilled in the art of computer software.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. An image processing apparatus comprising:
    a signal receiver configured to receive a broadcast signal;
    a signal processor configured to process the broadcast signal;
    a display;
    a communicator comprising communication circuitry configured to communicate with a server; and
    a controller configured to:
    receive a user input selecting a channel among a plurality of channels;
    control the signal receiver to receive a broadcast signal corresponding to the selected channel;
    control the signal processor to process the received broadcast signal;
    control the communicator to access the server to receive a video stream corresponding to the selected channel;
    control the display to display an image of the received video stream, while the signal processor processes the received broadcast signal, and
    control the display to terminate displaying the image of the received video stream and display an image of the processed broadcast signal in response to completing that the signal processor processes the received broadcast signal.

2. The image processing apparatus according to claim 1, wherein the signal processor is configured to extract a first extraction information corresponding to a certain channel from the broadcast signal received in the signal receiver, and
    the controller is configured to receive the second extraction information from the server through the communication circuitry of the communicator and to provide the second extraction information to the signal processor to cause the signal processor to skip extracting the first extraction information in response to a channel selecting instruction of the broadcast signal.

3. The image processing apparatus according to claim 2, wherein the signal receiver is configured to receive the broadcast signal through a broadcast network, and the communication circuitry of the communicator is configured to communicate with the server through a broadband network.

4. The image processing apparatus according to claim 2, wherein the signal processor comprises a demultiplexer configured to extract packet identifier (PID) information from the broadcast signal received in the signal receiver and to extract video data from the broadcast signal based on the extracted PID information, and
    the controller is configured to acquire the PID information from the second extraction information received through the communication circuitry of the communicator and to provide the PID information to the demultiplexer to cause the demultiplexer to skip extracting the PID information.

5. The image processing apparatus according to claim 2, wherein the controller is configured to receive, from the server, the second extraction information of a channel corresponding to the channel selecting instruction from among a plurality of channels of the broadcast signal.

6. The image processing apparatus according to claim 2, further comprising a storage, wherein
    the controller is configured to receive, from the server, the second extraction information of all channels involved in the broadcast signal in response to the channel selecting instruction, to store the second extraction information in the storage, and to call the second extraction information from the storage in response to a channel selecting instruction received after storing the second extraction information in the storage.

7. The image processing apparatus according to claim 2, further comprising a storage configured to store a channel map, wherein
the controller is configured to acquire uniform resource locator (URL) information of the second extraction information of a channel selected in the broadcast signal from the channel map in response to the channel selecting instruction, and to acquire the second extraction information stored in the server based on the URL information.

8. The image processing apparatus according to claim 2, wherein the first extraction information and the second extraction information comprise metadata of the broadcast signal.

9. The image processing apparatus according to claim 1, wherein the controller is configured to process a first broadcast signal to display a second channel image in response to an instruction for switching from a first channel in the first broadcast signal received in the signal receiver to a second channel, to process a second broadcast signal received through the communication circuitry of the communicator and having the same content as the first broadcast signal to display a second channel image of the second broadcast signal, and
the controller is configured to stop displaying the second channel image of the second broadcast signal and to start displaying the second channel image of the first broadcast signal in response to processing completion of the first content signal.

10. The image processing apparatus according to claim 9, wherein the controller is configured to synchronize the second channel image of the second broadcast signal with the second channel image of the first broadcast signal by determining a video frame having a time stamp equal to a video frame in the second broadcast signal from among video frames in the first broadcast signal.

11. A method of controlling an image processing apparatus, the method comprising:
receiving a user input selecting a channel among a plurality of channels;
by a signal receiver, receiving a broadcast signal corresponding to the selected channel;
by a signal processor, processing the received broadcast signal;
by a communicator including communication circuitry, accessing the server to receive a video stream corresponding to the selected channel;
displaying an image of the received video stream, while the signal processor processes the received broadcast signal; and
in response to completing that the signal processor processes the received broadcast signal, terminating displaying the image of the received video stream and displaying an image of the processed broadcast signal.

12. The method according to claim 11, wherein the signal processor is configured to extract a first extraction information corresponding to a certain channel from the broadcast signal,
receiving a second extraction information from the server and providing the second extraction information to the signal processor to cause the signal processor to skip extracting the first extraction information in response to a channel selecting instruction of the broadcast signal.

13. The method according to claim 12, wherein the image processing apparatus is configured to receive the broadcast signal through a broadcast network, and to communicate with the server through a broadband network.

14. The method according to claim 12, wherein the signal processor comprises a demultiplexer configured to extract packet identifier (PID) information from the broadcast signal and to extract video data from the broadcast signal based on the extracted PID information, and
the providing the second extraction information received from the server to the signal processor comprises acquiring the PID information from the second extraction information and providing the PID information to the demultiplexer to cause the demultiplexer to skip extracting the PID information.

15. The method according to claim 12, wherein the receiving the second extraction information comprises receiving from the server the second extraction information of a channel corresponding to the channel selecting instruction from among a plurality of channels of the broadcast signal.

16. The method according to claim 12, wherein the receiving the second extraction information comprises
receiving and storing from the server the second extraction information of all channels involved in the broadcast signal in response to the channel selecting instruction; and
calling the previously stored second extraction information in response to a channel selecting instruction provided after storing the second extraction information of all the channels.

17. The method according to claim 12, wherein the receiving the second extraction information comprises:
acquiring URL information of the second extraction information of a channel selected in the broadcast signal from a channel map in response to the channel selecting instruction; and
acquiring the second extraction information stored in the server based on the URL information.

18. The method according to claim 12, wherein the first extraction information and the second extraction information comprise metadata of the broadcast signal.

19. The method according to claim 11, further comprising:
processing a first broadcast signal to display a second channel image in response to an instruction for switching from a first channel in the first broadcast signal received from the content source to a second channel, and processing a second broadcast signal received from the server and having the same content as the first broadcast signal to display a second channel image of the second broadcast signal; and
stopping displaying the second channel image of the second broadcast signal and starting displaying the second channel image of the first broadcast signal in response to processing completion of the first broadcast signal.

20. The method according to claim 19, wherein the stopping displaying the second channel image of the second broadcast signal and the starting displaying the second channel image of the first broadcast signal comprises:
synchronizing the second channel image of the second broadcast signal with the second channel image of the first broadcast signal by determining a video frame having a time stamp which is equal to a video frame in the second broadcast signal from among video frames in the first broadcast signal.

\* \* \* \* \*